US006366940B1

United States Patent
Ono et al.

(10) Patent No.: US 6,366,940 B1
(45) Date of Patent: Apr. 2, 2002

(54) HIGH-SPEED MODULAR MULTIPLICATION APPARATUS ACHIEVED IN SMALL CIRCUIT

(75) Inventors: Takatoshi Ono, Aichi-ken; Natsume Matsuzaki, Minou; Hiroshi Kashiwa, Itami, all of (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/261,614

(22) Filed: Mar. 2, 1999

(30) Foreign Application Priority Data

Mar. 2, 1998 (JP) .......................... 10-049152
Jun. 4, 1998 (JP) .......................... 10-156473

(51) Int. Cl.[7] .............................................. G06F 7/38
(52) U.S. Cl. ..................................................... 708/491
(58) Field of Search ............................ 708/491–492; 380/28

(56) References Cited

U.S. PATENT DOCUMENTS

| 5,684,731 | A | | 11/1997 | Davis | |
| 6,009,450 | A | * | 12/1999 | Dworkin et al. | 708/492 |
| 6,049,815 | A | * | 4/2000 | Lambert et al. | 708/492 |
| 6,085,210 | A | * | 7/2000 | Buer | 708/491 |
| 6,230,179 | B1 | * | 5/2001 | Dworkin et al. | 708/492 |

FOREIGN PATENT DOCUMENTS

| JP | 3250314 | 11/1991 |
| JP | 5307465 | 11/1993 |

\* cited by examiner

Primary Examiner—Tan V. Mai
(74) Attorney, Agent, or Firm—Price and Gess

(57) ABSTRACT

The modular multiplication apparatus includes a residue calculating unit, a multiplier division unit, a partial product calculation unit, an accumulation unit, a correction unit, and a control unit. The residue calculating unit recurrently calculates intermediate values in sequence. The residue calculating unit obtains the multiplicand as the intermediate value first time, and at the second time and after, calculates residues or congruent values of the modulo P multiplication of the intermediate values being preceding intermediate values left-shifted s bits. The multiplier division unit divides the multiplier into a plurality of s-bit partial multipliers in order from lower bits. The partial product calculation unit calculates partial products of intermediate values and partial multipliers in sequence. The accumulation unit and the correction unit accumulate the partial products while correcting them under the control of the control unit. The residue calculating unit includes a table unit. The table unit prestores residues of modulo p multiplications of (m-bit value) $*2^k$, where the m-bit values respectively correspond to values from decimal values 0 to $2^m-1$. The residue calculating unit refers to the table unit to read out a residue corresponding to higher m bits adjacent to the lower k bits of the left-shifted intermediate value. The residue calculating unit calculates a residue or a congruent value of modulo p multiplications of the left-shifted intermediate value by adding up the read-out residue and the lower k bits.

79 Claims, 17 Drawing Sheets

FIG. 4A

ROM TABLE 309

| INPUT VALUE | OUTPUT VALUE |
|---|---|
| 0000 | 0 |
| 0001 | $1 \times 32\alpha$ |
| 0010 | $2 \times 32\alpha$ |
| 0011 | $3 \times 32\alpha$ |
| ⋮ | ⋮ |
| 1110 | $14 \times 32\alpha$ |
| 1111 | $15 \times 32\alpha$ |

FIG. 4B

ROM TABLE 308

| INPUT VALUE | OUTPUT VALUE |
|---|---|
| 00000 | 0 |
| 00001 | $1 \times \alpha$ |
| 00010 | $2 \times \alpha$ |
| 00011 | $3 \times \alpha$ |
| ⋮ | ⋮ |
| 11110 | $30 \times \alpha$ |
| 11111 | $31 \times \alpha$ |

FIG. 10

ROM TABLE 904

| INPUT VALUE (10-BIT) | OUTPUT VALUE (64-BIT) |
|---|---|
| 0000000000 | 0 |
| 0000000001 | $1 \times 2^{160} \bmod P$ |
| 0000000010 | $2 \times 2^{160} \bmod P$ |
| 0000000011 | $3 \times 2^{160} \bmod P$ |
| ⋮ | ⋮ |
| 1111111111 | $(2^{10}-1) \times 2^{160} \bmod P$ |

FIG. 14A

| y[8] | y[7] | y[6] | y[5] | y[4] | y[3] | y[2] | y[1] | y[0] | O1 | O0 | F |
|---|---|---|---|---|---|---|---|---|---|---|---|
| 0 | 0 | 0 | - | - | - | - | - | - | Z | Z | 0 |
| 0 | 0 | 1 | - | - | - | - | - | - | Z | I0 | 0 |
| 0 | 1 | 0 | - | - | - | - | - | - | Z | I1 | 0 |
| 0 | 1 | 1 | - | - | - | - | - | - | I1 | I0 | 0 |
| 1 | 0 | 0 | - | - | - | - | - | - | I2 | Z | 0 |
| 1 | 0 | 1 | - | - | - | - | - | - | I2 | I0 | 0 |
| 1 | 1 | 0 | - | - | - | - | - | - | I2 | I1 | 0 |
| 1 | 1 | 1 | # | # | # | - | - | - | I3 | $\overline{I0}$ | 1 |
| 1 | 1 | 1 | 1 | 1 | 1 | - | - | - | I3 | Z | 0 |

FIG. 14B

| y[8] | y[7] | y[6] | y[5] | y[4] | y[3] | y[2] | y[1] | y[0] | O1 | O0 | F |
|---|---|---|---|---|---|---|---|---|---|---|---|
| - | - | - | 0 | 0 | 0 | - | - | - | Z | Z | 0 |
| - | - | - | 0 | 0 | 1 | - | - | - | Z | I0 | 0 |
| - | - | - | 0 | 1 | 0 | - | - | - | Z | I1 | 0 |
| - | - | - | 0 | 1 | 1 | - | - | - | I1 | I0 | 0 |
| - | - | - | 1 | 0 | 0 | - | - | - | I2 | Z | 0 |
| - | - | - | 1 | 0 | 1 | - | - | - | I2 | I0 | 0 |
| - | - | - | 1 | 1 | 0 | - | - | - | I2 | I1 | 0 |
| # | # | # | 1 | 1 | 1 | # | # | # | I3 | $\overline{I0}$ | 1 |
| # | # | # | 1 | 1 | 1 | 1 | 1 | 1 | I3 | Z | 0 |
| 1 | 1 | 1 | 1 | 1 | 1 | # | # | # | Z | $\overline{I0}$ | 1 |
| 1 | 1 | 1 | 1 | 1 | 1 | 1 | 1 | 1 | Z | Z | 0 |

FIG. 14C

| y[8] | y[7] | y[6] | y[5] | y[4] | y[3] | y[2] | y[1] | y[0] | O1 | O0 | F |
|---|---|---|---|---|---|---|---|---|---|---|---|
| - | - | - | - | - | - | 0 | 0 | 0 | Z | Z | 0 |
| - | - | - | - | - | - | 0 | 0 | 1 | Z | I0 | 0 |
| - | - | - | - | - | - | 0 | 1 | 0 | Z | I1 | 0 |
| - | - | - | - | - | - | 0 | 1 | 1 | I1 | I0 | 0 |
| - | - | - | - | - | - | 1 | 0 | 0 | I2 | Z | 0 |
| - | - | - | - | - | - | 1 | 0 | 1 | I2 | I0 | 0 |
| - | - | - | - | - | - | 1 | 1 | 0 | I2 | I1 | 0 |
| - | - | - | # | # | # | 1 | 1 | 1 | I3 | $\overline{I0}$ | 1 |
| - | - | - | 1 | 1 | 1 | 1 | 1 | 1 | Z | $\overline{I0}$ | 1 |

TO MULTIPLICAND UPDATING UNIT

FIG. 17

| b8 | b7 | b6 | b5 | b4 | b3 | b2 | b1 | b0 | O1 | O2 | F |
|---|---|---|---|---|---|---|---|---|---|---|---|
| - | - | - | 0 | 0 | 0 | - | - | - | Z | Z | 0 |
| - | - | - | 0 | 0 | 1 | - | - | - | Z | I0 | 0 |
| - | - | - | 0 | 1 | 0 | - | - | - | Z | I1 | 0 |
| - | - | - | 0 | 1 | 1 | - | - | - | I1 | I0 | 0 |
| - | - | - | 1 | 0 | 0 | - | - | - | I2 | Z | 0 |
| - | - | - | 1 | 0 | 1 | - | - | - | I2 | I0 | 0 |
| - | - | - | 1 | 1 | 0 | - | - | - | I2 | I1 | 0 |
| - | - | - | 1 | 1 | 1 | - | - | - | I3 | $\overline{I0}$ | 1 |
| - | - | - | 1 | 1 | 1 | 1 | 1 | 1 | I3 | Z | 0 |
| 1 | 1 | 1 | 1 | 1 | 1 | - | - | - | Z | $\overline{I0}$ | 1 |
| 1 | 1 | 1 | 1 | 1 | 1 | 1 | 1 | 1 | Z | Z | 0 |

HIGH-SPEED MODULAR MULTIPLICATION APPARATUS ACHIEVED IN SMALL CIRCUIT

BACKGROUND OF THE INVENTION (1) Field of the Invention

This invention relates to a modular multiplication apparatus which performs modular multiplications.

(2) Description of the Prior Art

Recently, as the encryption has been sophisticated in the field of communications, the encryption requires various calculation apparatuses.

For example, modular multiplication apparatuses for performing modular multiplications are used in the elliptic curve cryptosystem. It should be noted here that the "modular multiplication" indicates an operation denotes as "(a*b) mod p," where a, b, and p are integers respectively representing a multiplicand, a multiplier, and a modulus. This operation is also referred to as a modulo p multiplication of (a*b), and (a*b) mod p is also referred to as residue, or modular multiplication value.

FIG. 1 shows the construction of a conventional modular multiplication apparatus.

It is assumed that values a, b, and p used in the operations performed by the conventional modular multiplication apparatus are each as small as 4 bits, for the sake of conveniences.

The modular multiplication apparatus 1 includes a product calculating unit 2, a residue calculating unit 3, and a control unit 4.

The product calculating unit 2, including a multiplicand register 5 (4-bit), an adder 6 (4-bit), and a product register 7 (9-bit), calculates a*b (a multiplication of multiplicand a and multiplier b) under control of the control unit 4.

The following is a description of the procedures by which the control unit 4 controls the product calculating unit 2.

Step 1: The control unit 4 allows the multiplicand register 5 to store the multiplicand a, allows the lower four bits of the product register 7 to store the multiplier b, and allows the higher five bits of the product register 7 to store 0s.

Step 2: The control unit 4 judges whether the least significant bit (LSB) of the product register 7 is 0 or 1. When having judged that the LSB is 1, the control unit 4 allows the adder 6 to add four bits out of the higher five bits excluding the most significant bit (MSB) stored in the product register 7 to the multiplicand a stored in the multiplicand register 5, and allows the higher five bits of the product register 7 to store the addition result.

Step 3: The control unit 4 performs a right shift of one bit on the value stored in the product register 7.

Step 4: The control unit 4 repeats Steps 2 and 3 four times.

When the loop including Steps 2 and 3 has been executed four times, the product register 7 stores the product a*b.

The residue calculating unit 3 includes a modulus register 8 (4-bit), an adder 9 (5-bit), and a residue register 10 (13-bit). The residue calculating unit 3 calculates, under control of the control unit 4, (a*b) mod p in the same manner as a calculation by manual writing. Note that the residue output from the residue calculating unit 3 is a 5-bit value with a sign bit.

The following is a description of the procedures by which the control unit 4 controls the residue calculating unit 3.

Step 5: The control unit 4 allows the modulus register 8 to store the modulus p, allows the lower eight bits of the residue register 10 to store the product (a*b) read from the product register 7, and allows the higher five bits of the residue register 10 to store 0s.

Step 6: The control unit 4 performs a left shift of one bit on the value stored in the residue register 10.

Step 7: The control unit 4 allows the adder 9 to subtract the modulus p read from the modulus register 8 from the value read from the higher five bits of the residue register 10 and to store the subtraction result value in the higher five bits of the residue register 10.

Step 8: The control unit 4 judges whether the value stored in the higher five bits of the residue register 10 is positive or negative based on the MSB. When having judged that the value is negative (the MSB is 1), the control unit 4 allows the adder 9 to add up the value stored in the higher five bits of the residue register 10 and the modulus p stored in the modulus register 8 to restore the previous value (the value before the subtractions performed in Step 7) to the register 10.

Step 9: The control unit 4 repeats Steps 6 to 8 eight times.

When the loop including Steps 6 to 8 has been executed eight times, the higher five bits of the residue register 10 stores the residue (a*b) mod p.

In the conventional modular multiplication apparatus 1, 4-bit addition operations are enough for the adder 6 and adder 9 since the values a, b, and p are each as small as 4-bit, and the number of executions of a loop is as small as four times in the product calculating unit 2 and as eight times in the residue calculating unit 3. However, in practice, the values a, b, and p used in the elliptic curve cryptosystem are each as great as 160-bit, for example. Accordingly, the adder 6 and adder 9 will be required to perform 160-bit addition operations if the apparatus 1 is adjusted to deal with values 160-bit values a, b, and p, for example. This results in an increase in the circuit size which is one of the problems of the conventional modular multiplication apparatus 1. Also, in this case, the number of executions of a loop is as great as 160 in the product calculating unit 2 and as 320 in the residue calculating unit 3. This results in an increase in the time taken for performing operations, which is another problem of the conventional apparatus 1.

The U.S. Pat. No. 5,144,574, Modular Multiplication Method and the System for Processing Data discloses a modular multiplication method which relates to the above operation-time problem.

According to this method, the residue (a*b) mod p is obtained by the following procedure: a partial product is calculated by multiplying the multiplicand a by each two bits of the multiplier b in order from the MSB; each time the partial product is obtained, a partial residue is calculated by subtracting an integral multiple of the modulus p from the calculated partial product; and the residue (a*b) mod p is obtained by accumulating the calculated partial products.

Compared with the first conventional method, this method reduces the number of executions of the loop and the operation time since the partial product is calculated for each two bits of the multiplier b while in the first method, the product is calculated for each bit.

However, the time reduced by the second conventional method is not so much when the values a, b, and p to be dealt with are large.

SUMMARY OF THE INVENTION

It is therefore an object of the present invention to provide a modular multiplication apparatus which is achieved in a small circuit and performs calculations at high speed.

The above object is fulfilled by a modular multiplication apparatus for calculating a congruent value of a modulo P multiplication of a product of a multiplicand a and a $k_b$-bit multiplier b, where P is k-bit, the congruent value being obtained from a following formula:

$$\text{accumulated value} = \sum_{i=0}^{[[kb/s]]} C(i) * b[s*i+s-1:s*i],$$

where [[kb/s]] represents integers included in quotient $k_b/s$, i represents integers in a range of 0 to [[kb/s]],
C(i) is represented by a recurrence formula, and $C(i)=a(i=0)$ $C(i)=(C(i-1)*2^s) \bmod P (i \geq 1)$, C(i) (intermediate value) is a congruent value of a modulo P multiplication of a product (a preceding intermediate value*$2^s$), where the congruent value is calculated recurrently, an initial intermediate value is the multiplicand a, and the product being equal to the preceding intermediate value shifted s bits, b[s*i+s-1:s*i] represents s-bit, partial multipliers included in the multiplier b at places from $2^{s*i+s-1}$ to $2^{s*i}$, the modular multiplication apparatus comprising: a table unit which prestores residues of modulo p multiplications of (m-bit value)*$2^k$, where m is an integer s or larger; an intermediate value calculation unit for outputting the multiplicand a as an intermediate value C(0) first time (i=0), and second time and after (i≧1), performing a shift of s bits on a preceding intermediate value C(i-1) to acquire a shifted intermediate value, referring to the table unit to read out a residue corresponding to m bits adjacent to lower k bits of the shifted intermediate value, and obtaining another intermediate value C(i) by adding up the read-out residue and the lower k bits, where partial product C(i)*b[s*i+s-1:s*i] is obtained for each combination of C(i) and b[s*i+s-1:s*i] corresponding to each other, and each partial product C(i)*b[s*i+s-1:s*i] is accumulated in sequence.

In the above-stated construction, the table unit prestores residues of modulo p multiplications of (m-bit value)*$2^k$, where the m-bits values respectively correspond to values from decimal values 0 to $2^m-1$. The intermediate value calculation unit, when i≧1, refers to the table unit to read out a residue corresponding to m bits adjacent to lower k bits of the left-shifted intermediated value, that is, a residue of modulo p multiplication of (higher m bits)*$2^k$. The intermediate value calculation unit calculates a residue or a congruent value of modulo p multiplications of the left-shifted intermediate value by adding up the read-out residue and the lower k bits.

Here, the lower k bits of the left-shifted intermediate value represent a residue itself or a congruent value of modulo p multiplication. The congruent value is larger than and the closest to the residue. Accordingly, to obtain a residue of modulo p multiplication of a left-shifted intermediate value or a congruent value closest to the residue, the intermediate value calculation unit is only required to obtain a residue and add up the residue and the lower k bits. That is to say, the intermediate value calculation unit calculates in short time a residue or a congruent value of modulo p multiplication of the left-shifted intermediate value by referring to the table unit to obtain the residue for the higher m bits.

If the residue or congruent value of modulo p multiplication of the left-shifted intermediate value was to be calculated with the procedure used by the conventional residue calculating unit 3 of the conventional modular multiplication apparatus 1, the intermediate value calculation unit would repeat the loop process (steps 6–8) a plurality of times. More specifically, the number of repetitions corresponds to the number of shifts and the number of bits of the intermediate value. In contrast, the intermediate value calculation unit of the present invention performs the same at a higher speed since the unit is only required to perform one reference to the table unit and one addition to acquire the residue or congruent value of modulo p multiplication of the left-shifted intermediate value, resulting in an achievement of a high-speed modular multiplication.

In the above modular multiplication apparatus, the intermediate value calculation unit may include: a first hold unit for holding an intermediate value; a shift unit for obtaining the shifted intermediate value by performing a shift of s bits on the intermediate value held by the first hold unit in correspondence to the partial multiplier b[s* i+s−1:s*i]; a division unit for dividing the shifted intermediate value into a higher data and a lower data, where the higher data is composed of m bits adjacent to lower k bits of the shifted intermediate value, and the lower data is composed of the lower k bits; a read unit for referring to the table unit to read out a residue corresponding to the higher data; and an addition unit for calculating another intermediate value by adding up the read-out residue and the lower data, where the first hold unit updates the intermediate value to the other intermediate value calculated by the addition unit each time the addition unit calculates a new intermediate value, and outputs the multiplicand as an intermediate value first time, and outputs the updated intermediate value second time and after.

With the above-stated construction, each component of the intermediate value calculation unit is achieved using a general-purpose hardware device in a simple construction. More specifically, the first hold unit is achieved by a register, the shift unit a shifter, and the addition unit an adder. Also, the division unit is achieved by an m-bit bus and a k-bit bus connected to the higher m-bit part and the lower k-bit part of the shifter. The intermediate value calculation unit including these components recurrently calculates the intermediate value C(i).

In the modular multiplication apparatus, the table unit may include: a memory device which prestores residues of modulo p multiplications of (m-bit value)*$2^k$, where storage areas of residues respectively correspond to addresses to be input, and the addresses further correspond to m-bit values.

With the above-stated construction, the table unit is achieved by one memory device. The memory device prestores residues of modulo p multiplications of (m-bit value) *$2^k$, where the m-bit values respectively correspond to values from decimal values 0 to $2^m-1$. On receiving the higher m bits from the read unit as an address, the memory device outputs a residue which is stored in an area having the received address. With such an arrangement, it is possible for the intermediate value calculation unit to obtain the residue corresponding to the higher m bits in a short time by referring to the memory device only once.

In the modular multiplication apparatus, the m-bit value may be divided into an m1-bit value and an m2-bit value, where the m1-bit value is composed of lower m1bits and the m2-bit value is composed of higher m2 bits, where m=m1+m2, each m-bit value corresponds to a combination of an m1-bit value and an m2-bit value, the table unit includes: a first part table unit which prestores residues of modulo p multiplications of (m1-bit value)*$2^k$; and a second part table unit which prestores residues of modulo p multiplications of (m2-bit value)*$2^{k+m1}$, where the addition unit adds up residues respectively read out from the first part table unit and the second part table unit and the lower data.

In the above-stated construction, the table unit includes: the first part table corresponding to the higher m1 bits of the m bits; and the second part table corresponding to the lower m2bits. The first part table stores *$2^{m1}$ residues corresponding to the higher m1 bits. The second part table stores *$2^{m2}$ residues corresponding to the lower m2 bits. As understood from this, the sum of the numbers of residues stored in the first and second part tables is smaller than the number of residues stored in one memory device. Therefore, the table unit is also achieved by two memory devices with small capacity.

In the above modular multiplication apparatus, the m bits may be divided into t bit-sequences respectively having m1 bits, m2bits, . . . mt bits in order from lower bits, where $3 \leq t \leq m$, each m-bit value corresponds to a combination of values respectively represented by t bit-sequences mi, where i represents each integer in a range of 1 to t, the table unit includes: t partial table unit Ti which each prestore residues of modulo p multiplications of (mi-bit value)*$2^{k+x}$, where x=m1+m2+. . . +m(i−12), and the addition unit adds up t residues respectively read out by the read unit from the t partial table unit Ti and the lower data.

With the above-stated construction, the table unit includes t partial tables which respectively correspond to the values of t partial bits making up the m bits. With this construction, the number of residues stored in each partial table is small.

In the above modular multiplication apparatus, the m bits may be divided into t bit-sequences respectively having m1 bits, m2 bits, . . . mt bits in order from lower bits, where $2 \leq t \leq m$, the table unit includes: t partial table unit Ti which each prestore residues of modulo p multiplications of (a value represented by bit-sequences mi)*$2^{k+x}$, where $$x = \sum_{j=1}^{i-1} mj,$$

the addition unit adds up t residues respectively read out by the read unit from the t partial table unit Ti and the lower data, where a result of this addition is equivalent to the other intermediate value.

With the above-stated construction, the table unit includes t partial tables which respectively correspond to the values of t partial bits making up the m bits. With this construction, the number of residues stored in each partial table is small.

In the above modular multiplication apparatus, each of the t partial table unit Ti may prestore each of the residues as k-bit data.

The above modular multiplication apparatus may further comprise: an accumulation unit; and a correction unit, where the accumulation unit includes: a third register for holding 0 as an initial value; and an adder for adding up the partial products C(i)*b[s*i+s−1:s*i] and the accumulated value stored in the third register and storing a result of this addition into the third register as another accumulated value, where the correction unit includes: a correction value hold unit for holding a correction value being an integral multiple of P; and a correction control unit for allowing the adder to subtract the correction value held by the correction value hold unit from the accumulated value held by the third register when the accumulated value is larger than a predetermined value.

With the above-stated construction, overflows in the third register are prevented from occurring since the adder subtracts the correction value from the accumulated value when the accumulated value is larger than a predetermined value.

In the above modular multiplication apparatus, the third register may include a sign bit, the correction control unit allows the adder to subtract the correction value from the accumulated value at the same time when the adder adds up the partial product and the accumulated value stored in the third register when the accumulated value is positive, and the correction value is an integral multiple of P and the absolute value of the correction value is equivalent to or smaller than a maximum value (t+1) ($2^S$−1)P of the partial product.

With the above-stated construction, overflows in the third register are prevented from occurring since the correction control unit allows the adder to subtract the correct value from the accumulated value stored in the third register when the accumulated value is positive (sign bit is 1). Also, the last accumulated value is smaller than or close to P after the correction since the correction value is an integral multiple of P and is the maximum value (t+1) (2s−1)P of the partial product or smaller.

In the above modular multiplication apparatus, the modulo P multiplication may satisfy P=$2^k$−α, each of the t partial table unit Ti prestores each of the residues as k3-bit data, where k3 is equivalent to the number of bits in t* $2^m$*α, and α is a constant defined to satisfy a condition that k3 is smaller than k.

With the above-stated construction, each residue stored in the partial tables Ti is k3-bit or smaller. This reduces the number of bits of each residue output from the partial tables. The bit width of the addition unit is also limited in accordance with the limitation that each residue output from the partial tables is k3-bit or smaller.

In the above modular multiplication apparatus, each of the t partial table unit Ti may include $2^{mi}$ entries which respectively correspond to values in a range of 0 to ($2^{mi}$−1) each having mi bits, where the $j^{th}$ $^{m1+}$entry stores (j−1)*2 . . . $^{+m(i−1)}$*α, where j=1, . . . $2^{mi}$.

With the above-stated construction, the size of the partial table Ti is small since the number of entries is limited to as small as $2^{mi}$−1.

Here, suppose that α is u-bit. Then, the number of bits of the $j^{th}$ entry is limited to the sum of the number of bits of j, m1+. . . +m(i−1), and u bits, at maximum. Accordingly, the bit width of the addition unit is also limited in accordance with this limitation.

The above modular multiplication apparatus may further comprise: a post-processing unit for using the table unit to obtain a residue of a modulo P multiplication of a last accumulated value having been corrected by the correction unit, where the last accumulated value is an accumulated value corrected by the correction unit in correspondence to a partial multiplier including the most significant bit of the multiplier.

With the above-stated construction, it is possible to make the last accumulated value smaller than P by allowing the post-processing unit to obtain the residue of modulo P multiplication of the last accumulated value.

The above object is also fulfilled by a modular multiplication apparatus for calculating a congruent value of a modulo P multiplication of a product of a multiplicand and a multiplier, where P is k-bit data, the modular multiplication apparatus comprising: an output unit for outputting, in order from lower bits, partial multipliers which are s-bit parts making up the multiplier, where s is an integer 2 or larger; a first calculation unit for obtaining shifted multiplicands by shifting the multiplicand in accordance with a place of each partial multiplier, and for calculating congruent values of a modulo p multiplication of respective shifted multiplicands, where the congruent values obtained here are referred to as intermediate values; a second calculation unit for calculating partial products by multiplying the partial multipliers output from the output unit by the corresponding intermediate values output from the first calculation unit; an accumulation unit for accumulating the partial products output from the second calculation unit and outputting an accumulated value; a correction unit for performing a correction so that the accumulated value does not exceed a predetermined number of bits by adding/subtracting an integral multiple of p to/from the accumulated value; and a control unit for allowing the first calculation unit, the second calculation unit, the accumulation unit, and the correction unit to repeatedly perform the respective operations for each of the partial multipliers output from the output unit, where the first calculation unit includes: a table unit which prestores residues of modulo p multiplications of (m-bit value)*$2^k$, where ms is an integer s or larger, where the first calculation unit outputs the multiplicand as an intermediate value first time, and second time and after, obtains a shifted intermediate value by performing a shift of s bits on a preceding intermediate value, refers to the table unit to read out a residue corresponding to m bits adjacent to lower k bits of the shifted intermediate value, and calculates another intermediate value by adding up the read-out residue and the lower k bits.

With the above-stated construction, the first calculation unit, in the second round and after in the loop, refers to the table unit to read out a residue corresponding to the higher m bits excluding the lower k bits of the intermediate value left-shifted by s bits, and calculates a residue or congruent value of modulo P multiplication of the left-shifted intermediate value as an intermediate value by adding up read-out residue and the lower k bits. With this arrangement, the first calculation unit calculates the residue at high speed.

The second calculation unit calculates each partial product of each s-bit partial multiplier and the intermediate value. Accordingly, the second calculation unit performs the calculation of the partial product as many times as the number of partial multipliers. This allows the second calculation unit to calculate faster than the product calculating unit 2 of the conventional technique since the number of operations performed by the second calculation unit is reduced.

In the above modular multiplication apparatus, the first calculation unit may include: a first hold unit for holding an intermediate value; a shift unit for obtaining the shifted intermediate value by performing a shift of s bits on the intermediate value held by the first hold unit in correspondence to each partial multiplier output from the output unit second time and after; a division unit for dividing the shifted intermediate value into a higher data and a lower data, where the higher data is composed of m bits adjacent to lower k bits of the shifted intermediate value, and the lower data is composed of the lower k bits; a read unit for referring to the table unit to read out a residue corresponding to the higher data; and an addition unit for calculating another intermediate value by adding up the read-out residue and the lower data, where the first hold unit updates the intermediate value to the other intermediate value calculated by the addition unit, and outputs the multiplicand as an intermediate value first time, and outputs the updated intermediate value second time and after, and the second calculation unit calculates partial products by using the intermediate value held by the first hold unit.

With the above-stated construction, such component of the intermediate value calculation unit is achieved using a general-purpose hardware device in a simple construction. More specifically, the first hold unit is achieved by a register, the shift unit a shifter, and the addition unit an adder. Also, the division unit is achieved by an m-bit bus and k-bit bus connected to the higher m-bit part and the lower k-bit part of the shifter. The intermediate value calculation unit including these components recurrently calculates the intermediate value C(i).

In the above modular multiplication apparatus, the control unit may control a pipeline process which includes a first stage, a second stage, and a third state, and in the first stage, the control unit allows the output unit to output a partial multiplier and allows the first calculation unit to output an intermediate value, in the second stage, the control unit allows the second calculation unit to output a partial product, and in the third stage, the control unit allows the accumulation unit to accumulate partial products and allows the correction unit to perform correction.

With the above-stated construction, the speed of the calculation by the modular multiplication apparatus is further increased since the pipeline process adopted here enables each component to operate effectively.

In the above modular multiplication apparatus, the output unit may include: a multiplier hold unit for holding the multiplier as an initial value and outputting a partial multiplier which is composed of lower s bits of a value currently held in the multiplier hold unit; a shift right unit for performing a shift right of s bits on a value held by the multiplier hold unit and outputting the right-shifted value to the multiplier hold unit so that the right-shifted value is stored in the multiplier hold unit.

With the above-stated construction, the output unit is simply achieved by a register for holding the multiplier and a shifter for performing a shift right of s bits on the multiplier held by the register.

In the above modular multiplication apparatus, the second calculation unit may include: a judgment unit for judging whether all bits of the s-bit partial multiplier output from the output unit are 1; a first generation unit for generating a product of a multiplication of the intermediate value and $2^S$; and generating a negative value of the multiplicand; a second generation unit for generating a product of a multiplication of the intermediate value and a bit weight of each bit of the partial multiplier, where the product is equivalent to the intermediate value shifted by the number of bits corresponding to each bit weight; and a second addition unit for: adding up each value generated by the first generation unit when the judgement unit judges that the all bits are 1; and adding up products corresponding to bits being binary value "1" in the partial multiplier out of the products generated by the second generation unit when the judgment unit does not judge that the all bits are 1.

With the above-stated construction, the addition unit adds up: the product of multiplication of the intermediate value and $2^S$ generated by the first generation unit; and the negative value of the multiplicand when the judgment unit judges that the all bits of the partial multiplier are 1. Here, in practice, the adder obtains a result of this subtraction by adding up the inverted value of the multiplicand and constant 1. Also, the addition of constant 1 is achieved by a carry-in. Accordingly, when all binary digits in the places of the multiplier are all "1," the adder can obtain the product by performing two additions and one carry-in. This reduces the number of addition operations performed by the addition unit make it possible to reduce the circuit size of the addition unit.

In the above modular multiplication apparatus, the second generation unit may include: $i^{th}$ shift unit for obtaining a shifted intermediate value by performing a shift of i bits on the intermediate value calculated by the first calculation unit, wherein i represents integers in a range of 1 to (s-1), the first generation unit includes: $s^{th}$ shift unit for obtaining a shifted intermediate value by performing a shift of s bits on the intermediate value calculated by the first calculation unit; a complement generation unit for generating a one's complement of the intermediate value; and a constant output unit for outputting a constant 1, wherein the second addition unit includes: a selection unit for: selecting the shifted intermediate value output from the $s^{th}$ shift unit, the one's complement generated by the complement generation unit, and the constant 1 when the judgment unit judges that the all bits are 1; and selecting the intermediate value when a bit at a place of $2^0$ of the partial multiplier has binary value "1" when the judgment unit does not judge that the all bits are 1; and selecting the shifted intermediate value output from the $i^{th}$ shift unit when a bit at a place of $2^i$ of the partial multiplier has binary value "1" when the judgment unit does not judge that the all bits are 1; and an adder for calculating the partial product by adding up values selected by the selection unit.

With the above-stated construction, the first to (s-1) shift units are achieved by shifters which perform shift left of one bit to (s-1) bits. The $s^{th}$ shift unit is achieved by a shifter which performs a shift left of s bits. The complement generation unit is achieved by an inverter. As apparent from this, the first and second generation units can be achieved by general-purpose hardware devices. These components generate in advance candidate values which are to be added up by the addition unit. The selection unit selects candidate values to be added up by the addition unit in accordance with the values of the partial multipliers. The addition unit calculates the partial product by adding up the selected candidate values. With this construction, the second calculation unit calculates the partial product of the intermediate values at a plurality of places and the partial multipliers at high speed.

In the above modular multiplication apparatus, where s=3n, the partial multiplier may be divided into n 3-bit data sequences s1, . . . sn in order from lower bits, the second calculation unit includes: $j^{th}$ judgment unit for judging whether the 3-bit data sequence sj is $(111)_2$, where j represents integers in a range of 1 to n, $j^{th}$ special generation unit for generating a product of $I*(1000)_2*2^{3(j-1)}$ (I representing the intermediate value) and generating N (N representing a negative value of $I*2^{3(j-1)}$) when the $j^{th}$ judgment unit judges that the 3-bit data sequence sj is $(111)_2$, where $2^{3(j-1)}$ corresponds to a place of the 3-bit data sequence sj; $j^{th}$ general generation unit for generating, for each bit of the 3-bit data sequence sj, products of multiplications of a logical value of a current bit, each bit weight of each bit in the s-bit partial multiplier, and the intermediate value when the $j^{th}$ judgment unit does not judge that the 3-bit data sequence sj is $(111)_2$, where the product is equivalent to the intermediate value shifted by the number of bits corresponding to the bit weight; and a second addition unit for adding up the products generated by the $j^{th}$ special generation unit and the $j^{th}$ general generation unit.

In the above modular multiplication apparatus, the second calculation unit may include: $i^{th}$ shift unit for obtaining a shifted intermediate value by performing a shift of i bits on the intermediate value, where i represents integers in a range of 1 to s, where the $j^{th}$ general generation unit when j=1 uses shifted intermediate values obtained by the $i^{th}$ shift unit when i=1, 2, the $j^{th}$ general generation unit when j≠1 uses shifted intermediate values obtained by the $(3j-3)^{th}$ shift unit, $(3j-2)^{th}$ shift unit, and the $(3j1)^{th}$ shift unit, the j special generation unit uses shifted intermediate values obtained by the $3j^{th}$ shift unit, and the $j^{th}$ special generation unit and the (j+1) general generation unit share the $3j^{th}$ shift unit.

In the above modular multiplication apparatus, the $j^{th}$ special generation unit may include: a complement generation unit for generating one's complement of either of the intermediate value and the shifted intermediate value obtained by the $(3j-3)^{th}$ shift unit; and a constant output unit for outputting the constant 1, the second addition unit includes: a selection unit for: selecting the shifted intermediate value output from the $3j^{th}$ shift unit, the one's complement generated by the complement generation unit of the $j^{th}$ special generation unit, and the constant 1 output from the constant output unit of the $j^{th}$ special generation unit when the $j^{th}$ judgment unit judges that the 3-bit data sequence sj is $(111)_2$; selecting the intermediate value and outputs from the $(3j-2)^{th}$ shift unit and the $(3j-1)$ shift unit when the $j^{th}$ judgment unit does not judge that the 3-bit data sequence s1 is $(111)_2$; and selecting outputs from the $(3j-3)^{th}$ shift unit, the $(3j-2)^{th}$ shift unit, and the $(3j-1)$ shift unit when the $j^{th}$ judgment unit does not judge that the 3-bit data sequence sj except for the 3-bit data sequence s1 is $(111)_2$; and an adder for calculating the partial product by adding up values selected by the selection unit.

The above modular multiplication apparatus may further comprise: a post-processing unit for using the division unit, the read unit, and the addition unit to obtain a residue of a module P multiplication of a last accumulated value having been corrected by the correction unit, where the last accumulated value is an accumulated value corrected by the correction unit in correspondence to the partial multiplier output last from the output unit.

With the above-stated construction, the post-processing unit calculates the residue of the modulo P multiplication of the last accumulated value using the division unit, read unit, and addition unit. It is possible with this arrangement for the post-processing unit to obtain the last accumulated value smaller than P.

The above object is also fulfilled by a modular multiplication apparatus for calculating a congruent value of a modulo P multiplication of a product of a multiplicand and a multiplier, where P is k-bit data, the modular multiplication apparatus comprising: an output unit for outputting, in order from lower bits, partial multipliers which are s-bit parts making up the multiplier, where s is an integer 2 or larger; a first calculation unit for obtaining shifted multiplicands by shifting the multiplicand in accordance with a place of each partial multiplier, and for calculating congruent values of a modulo p multiplication of respective shifted multiplicands, where the congruent values obtained here are referred to as intermediate values; a second calculation unit for calculating partial products by multiplying the partial multipliers output from the output unit by the corresponding intermediate values output from the first calculation unit; an accumulation unit for accumulating the partial products output from the second calculation unit and outputting an accumulated value; a correction unit for performing a correction so that the accumulated value does not exceed a predetermined number of bits by adding/subtracting an integral multiple of p to/from the accumulated value; and a control unit for allowing the first calculation unit, the second calculation unit, the accumulation unit, and the correction unit to repeatedly perform the respective operations for each of the partial multipliers output from the output unit, where the second calculation unit includes: a judgment unit for judging whether all bits of the s-bit partial multiplier output from the output unit are 1; a first generation unit for generating a product of the intermediate value*$2^s$; and generating a negative value of the multiplicand; a second generation unit for generating a product of the intermediate value and a bit weight of each bit of the partial multiplier, where the product is equivalent to the intermediate value shifted by the number of bits corresponding to each bit weight; an addition unit for: adding up each value generated by the first generation unit when the judgment unit judges that the all bits are 1; and adding up products corresponding to bits being binary value "1" in the partial multiplier out of the products generated by the second generation unit when the judgment unit does not judge that the all bits are 1.

With the above-stated construction, the addition unit adds up: the product of multiplication of the intermediates value and $2^s$ generated by the first generation unit; and the negative value of the multiplicand when the judgment unit judges that the all bits of the partial multiplier are 1. The number of addition operations performed by the addition unit is reduced when all bits of the partial multiplier are 1. This reduces the load on the addition unit. When the judgment unit does not judge that the all bits are 1, the addition unit adds up the products corresponding to binary values "1" in the partial multiplier out of the s products generated by the second generation unit by multiplying the intermediate value and each bit weight of the partial multiplier.

With such a construction, the second calculation unit calculates partial products of multiple-digit values in a short time. Here, if the calculation method of the second calculating unit 2 in the conventional technique was used, the loop of steps 2–3 would be repeated s times to obtain the partial product of the intermediate value and the partial multiplier. In contrast, the second calculating unit of the present invention obtains the same in one process. The modular multiplication apparatus of the present invention calculates residues or congruent values of modulo P multiplications of the product of the multiplicand and the multiplier by accumulating the obtained partial products.

The above object is also fulfilled by a multiplication apparatus comprising: a judgement unit for judging whether all bits of an n-bit multiplier are 1, where n≧3; a generation unit for generating a value being a multiplicand*$2^n$ when the judgement unit judges that all bits are 1; a complement generation unit for generating one's complement of the multiplicand when the judgement unit judges that all bits are 1; and an addition unit for adding up the value being a multiplicand*$2^n$, one's complement of the multiplicand, and constant 1.

With the above-stated construction, the addition unit adds up the product of multiplicand*$2^n$ generated by the generation unit, one's complement of the multiplicand generated by the complement generation unit, and the constant 1 when the judgment unit judges that the all bits of the multiplier are 1. The sum of these values is equivalent to the product of the multiplicand and the multiplier. As apparent from this, when all bits of the multiplier are 1, the number of addition operations performed by the addition unit of the multiplication apparatus is reduced. This reduces the load on the addition unit and the circuit size of the addition unit.

In the above multiplication apparatus, the generation unit may be a shifter which performs a shift left of n bits and input 0 into each of lower n bits of the shifter.

The above object is also fulfilled by a multiplication apparatus which obtains a product by accumulating partial products which are obtained as results of multiplications of a multiplicand and partial multipliers making up a multiplier, the multiplication apparatus comprising: a division unit for dividing the multiplier into a plurality of n-bit partial multipliers, where n≧3; a judgement unit for judging whether all bits of an n-bit multiplier are 1; a first generation unit for generating a partial product using a sum of the multiplicand*$2^n$ and a negative value of the multiplicand when the judgement unit judges that all bits are 1; a second generation unit for generating a partial product using the multiplicand* (a partial multiplier) when the judgement unit does not judge that all bits are 1; and an accumulation unit for accumulating partial products generated by the first generation unit and the second generation unit in sequence.

In the above multiplication apparatus, the first generation unit may include: a shift unit for performing a shift left of n bits on the multiplicand when the judgement unit judges that all bits are 1; a complement generation unit for generating one's complement of the multiplicand; and an addition unit for adding up the multiplicand shifted by the shift unit, one's complement of the multiplicand, and 1.

With the above-stated construction, the first generation unit generates: the product of multiplication of the multiplicand and $2^n$; and the negative value of the multiplicand when the judgment unit judges that the all bits of the partial multiplier are 1. The second generation unit generates: the partial product of multiplication of the multiplicand and partial multipliers. The accumulation unit obtains the product of the multiplicand and the multiplier by accumulating the partial products generated by the first and second generation units. The first generation unit includes a shifter for performing a shift left of n bits on the multiplicand, a complement generation unit for generating one's complement of the multiplicand, and an addition unit for adding up the left-shifted multiplicand, one's complement of the multiplicand, and one. With such a construction, when all bits of the partial multiplier are 1, the number of addition operations performed by the addition unit is greatly reduced. This reduces the circuit size of the addition unit.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIGS. 4A and 4B show the contents of the ROM tables 308 and 309;

FIG. 10 shows the contents of the ROM table 904;

FIG. 14A shows relationships between the partial multiplier b(i) input to the control circuit 1306 and the input/output logic of the control circuit 1306;

FIG. 14B shows relationships between the partial multiplier b(i) input to the control circuit 1305 and the input/output logic of the control circuit 1305;

FIG. 14C shows relationships between the partial multiplier b(i) input to the control circuit 1304 and the input/output logic of the control circuit 1304;

FIG. 17 shows the input/output logic which is common to the operation value selectors 850, 851, and 852.

DESCRIPTION OF THE PREFERRED EMBODIMENTS

Embodiment 1

Figure 1:
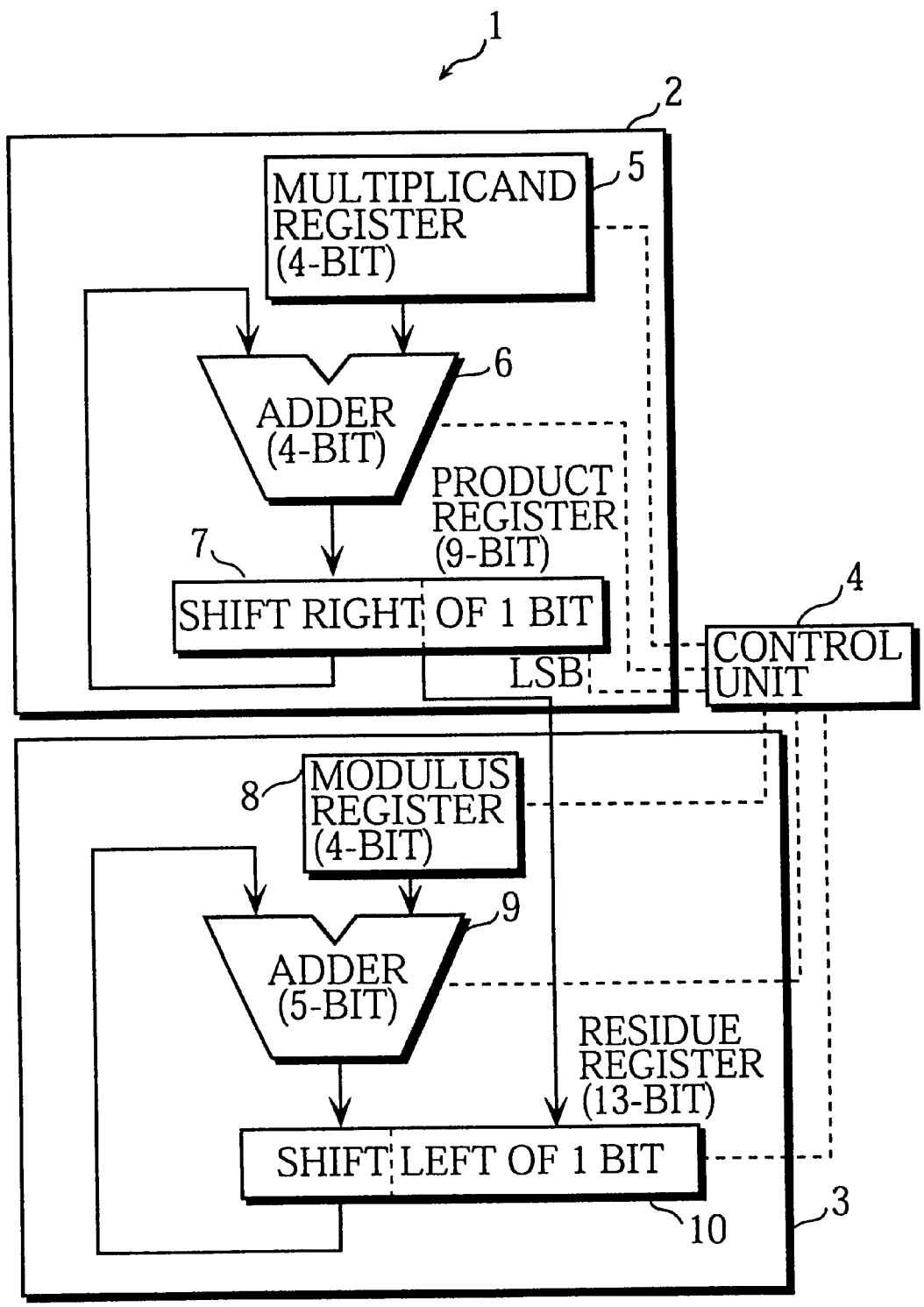
FIG. 1 shows the construction of a conventional modular multiplication apparatus.

An embodiment of the modular multiplication apparatus of the present invention will be described here with reference to the drawings.

The modular multiplication apparatus is used for performing operations in elliptic curve cryptosystems or the like. On receiving a multiplicand A (160 bits) and a multiplier B (160 bits), the modular multiplication apparatus acquires a residue R of A*B mod P (160 bits) (see Formula 1 below), or acquires a value being congruent with the residue R in the modulo p multiplication, where the modulus P is a value satisfying $P=2^{160}-\alpha$ when $\alpha$ has 54 bits or less.

The present modular multiplication apparatus is based on Formula 2 shown below which is a variation of Formula 1. See the end of this specification for a description of the transformation from Formula 1 to Formula 2.

Formula 1

$$R = A*B \bmod P$$

Formula 2

$$R1 = \sum_{i=1}^{k/s} C(i)*b(i)$$

$C(i)=A$ $(i-1)$ $C(i) \equiv C(i-1)*2^s \bmod P$ $(2 \leq i \leq k/s)$ $b(i)=b[s*i-1:s*(i-1)]$ Explanation of the Formulas In Formula 2, R1 is congruent with R in the modulo p multiplication. That is, the difference between R1 and R is a multiple of p.

R1 is obtained by accumulating the values $C(i)*b(i)$ when $i=1, 2, \ldots k/s$, where k is the number of bits of the multiplier B, s is the number of bits of each of partial multipliers which make up the multiplier B, k is divisable by s, and k/s is equal to the number of the partial multipliers.

$b(i)=b[s*i-1:s*(i-1)]$ indicates the partial multipliers which are obtained by dividing the multiplier B by s bits in order from lower bits (in ascending order). When i=1, b(1)=b[s-1:0]. When i=2, b(2)=b[2s-1:s]. When i=3, b(3)=b[3s-1:2s] ... Here, the binary notation of the k-bit multiplier B is denoted as b(k-1)b(k-2) ... b2b1b0. Also, b[x:y] indicates a bit sequence from the $(x+1)^{th}$ bit to the $(y+1)^{th}$ bit of the multiplier B in ascending order (x>y). For example, b[15:8] indicates a partial multiplier composed of the $16^{th}$ bit to the $9^{th}$ bit of the multiplier B. The binary notation of the bit sequence is denoted as b15b14b13b12b11b10b9b8.

When i=1, C(1)=A, where A is the multiplicand. When $2 \leq i \leq k/s$, the value C(i) is represented by a recurrence formula $C(i) \equiv C(i-1)*2^s \bmod P$. That is the value C(i) changes recurrently as C(1)=A (multiplicand), $C(2) \equiv A*2^s \bmod P$, $C(3) \equiv (A*2^s \bmod P)*2 \bmod P, \ldots$ In this recurrence formula, $2^s$ indicates a weight and $A*2^s$ indicates that the multiplicand A is shifted by s bits. Thus, C(i) is equivalent to a modulo p multiplication of a value obtained by shifting C(i-1) by s bits. Hereinafter, C(i) is referred to as an intermediate value.

As understood from Formula 2, R1 is obtained by recurrently calculating the intermediate values C(i) when i=1, 2, ... k/s, dividing the multiplier B by s bits in ascending order to obtain partial multipliers b(i), calculating the partial product $C(i)*b(i)$ k/s times, and accumulating the values $C(i)*b(i)$. Hereinafter, the process of repeating the operation k/s times to obtain R1 is referred to as loop process.

Construction of the Modular multiplication Apparatus

Figure 2:
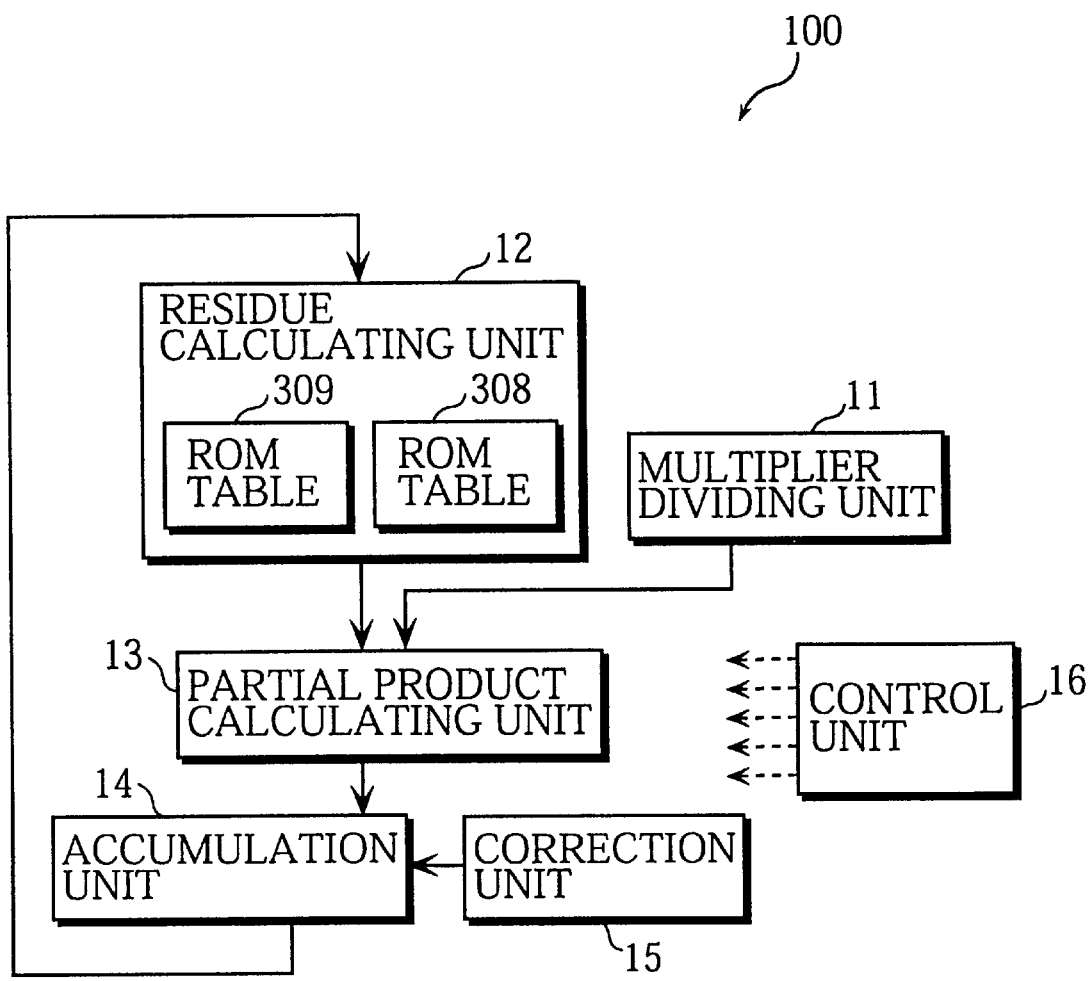
FIG. 2 is a block diagram showing the construction of the modular multiplication apparatus 100 in the present embodiment.

FIG. 2 is a block diagram showing the construction of the modular multiplication apparatus 100 in the present embodiment.

As shown in the drawing, the modular multiplication apparatus 100 includes a multiplier dividing unit 11, a residue calculating unit 12, a partial product calculating unit 13, an accumulation unit 14, a correction unit 15, and a control unit 16. The construction of the modular multiplication apparatus 100 is based on the Formula 2 when k=160 and s=8.

The multiplier dividing unit 11 outputs partial multipliers of the multiplier B in units in eight bits in order from lower bits, the partial multipliers being represented by b(i)=b[8i-1:8i-8] (i=1, ..., 19, 20).

The residue calculating unit 12 recurrently calculates intermediate values C(i) (i=1, ... 19, 20). First, that is, when i=1, the residue calculating unit 12 outputs the multiplicand as an intermediate value C(1). At the second time and after, the residue calculating unit 12 calculates intermediate values C(i) (i=2, ... 19, 20) from the modulo P multiplication of $C(i-1)*2^8$, the value $C(i-1)*2^8$ being equivalent to the preceding intermediate value shifted eight bits. More specifically, the residue calculating unit 12 acquires as the intermediate values C(i) the multiplicand A (first time), $A*2^8$ mod P (second time), $(A*2^8$ mod $P)2^8$ mod P (third time), $((A*2^8$ mod $P)*2^8$ mod $P)*2^8$ mod P (fourth time), ... Note that the C(i) calculated by the residue calculating unit 12 is congruent with $A*2^8$ mod P may be greater than P.

To perform the calculation of the residue at high speed, the residue calculating unit 12 includes a ROM table 308 and a ROM table 309. These ROM tables will be described in detail later, but they store a list of residues of the modulo P multiplication of a part of the shifted value $C(i-1)*2^8$ excluding the lower 160 bits, namely, a part higher than 160 bits after the shift. The residue calculating unit 12 refers to the ROM tables to obtain the residues for the part of the shifted value $C(i-1)*2^8$ excluding the lower 160 bits, then calculates the intermediate value $C(i)$ by adding an acquired residue to the lower 160 bits.

The partial product calculating unit 13 calculates partial products $C(i)*b(i)$ which are obtained by multiplications of the intermediate value $C(i)$ output from the residue calculating unit 12 and partial multipliers $b(i)$ output from the multiplier dividing unit 11.

The accumulation unit 14 accumulates the partial products $C(i)*b(i)$ output from the partial product calculating unit 13.

The correction unit 15 corrects the value accumulated by the accumulation unit 14 by adding or subtracting an integral multiple of P to/from the accumulated value to prevent an overflow from occurring to the accumulated value.

The control unit 16 controls a process in which the units 12 to 15 repeat an operation 20 times when i=1 to 20. Furthermore, the control unit 16 controls a pipeline process which is composed of three stages: first stage in which the residue calculating unit 12 calculates intermediate values and the multiplier dividing unit 11 calculates partial multipliers; second stage in which the partial product calculating unit 13 calculates partial products; and third stage in which the accumulation unit 14 accumulates the partial products and the correction unit 15 corrects the accumulated value. The control unit 16 further inputs the last-accumulated value to the residue calculating unit 12 to let the unit 12 calculate the residue of the value when the value is greater than P.

Figure 3:
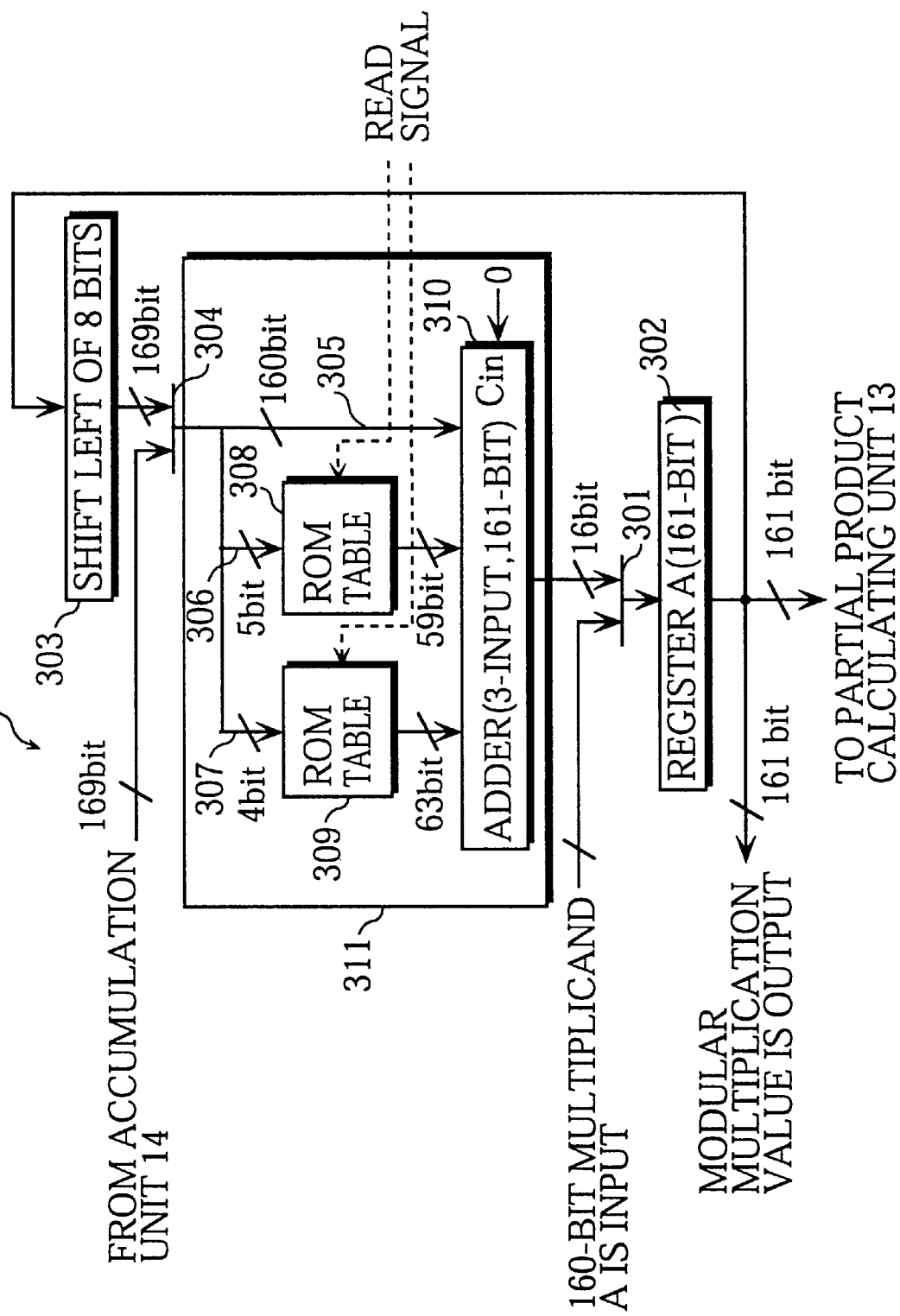
FIG. 3 shows the construction of the residue calculating unit 12.

FIG. 3 shows the construction of the residue calculating unit 12.

As shown in the drawing, the residue calculating unit 12 includes a selector 301, a register A 302, a shifter 303, a selector 304, and a residue operation unit 311.

The selector 301, under control of the control unit 16, outputs the multiplicand A, which is received from outside, to the register A 302 as the initialization when i=1. When $2 \leq i \leq 20$, the selector 301 outputs the intermediate value $C(i)$, which is received from the residue operation unit 311, to the register A 302.

The register A 302, being a 161-bit register, holds the multiplicand A (=C(1)) received from outside via the selector 301 as the initialization when i=1. When $2 \leq i \leq 20$, the register A 302 holds the intermediate value $C(i)$ received from the adder 310 via the selector 301. The register A 302, whose output is connected to both the partial product calculating unit 13 and the shifter 303, updates the intermediate value to a newly input intermediate value in accordance with an instruction from the control unit 16, and outputs the updated intermediate value to the partial product calculating unit 13 and the shifter 303.

The shifter 303, having 169 bits in width, performs a shift left of eight bits on each input value. The shifter 303 performs a shift left of eight bits on each input 161-bit intermediate value C (i-1) received from the register A 302, and outputs a 169-bit shifted value $C(i-1)*2^8$.

The selector 304, during the loop process, outputs the shifted value $C(i-1)*2^8$, which is input from the shifter 303, to the residue operation unit 311, then after the loop process, outputs the accumulated value received from the accumulation unit 14 to the residue operation unit 311.

The residue operation unit 311, including a ROM table 308, a ROM table 309, and an adder 310, outputs either a residue or a congruent value of the modulo P multiplication of a value selected by the selector 304, the selected value being either the shifted value $C(i-1)*2^8$ sent from the shifter 303, or the accumulated value sent from the accumulation value 14. This residue or congruent value has 161 bits.

The residue operation unit 311 also includes buses 305, 306, and 307, where the bus 305 is used to input the lower 160 bits of the 169-bit value received from the selector 304 to the adder 310, the bus 306 is used to input the $161^{st}$ bit to the $165^{th}$ bit to the ROM table 308, and the bus 307 is used to input the $166^{th}$ bit to the $169^{th}$ bit to the ROM table 309. These buses are used to divide the shifted value $C(i-1)*2^8$ or the accumulated value into a 160-bit part hereinafter, lower part), a 5-bit part, and a 4-bit part in the order from lower bits, and output these parts respectively to the adder 310, the ROM table 308, and the ROM table 309.

FIGS. 4A and 4B show the contents of the ROM tables 308 and 309.

FIG. 4B shows the contents of the ROM table 308. The ROM table 308 shows relationships between 5-bit input values $(00000)_2$ to $(11111)_2$ and output values which are residues of the modulo P multiplication of corresponding input values multiplied by $2^{160}$. In FIG. 4B, $\alpha$ is defined as $\alpha=2^{160} \bmod P$ since $\alpha$ satisfies $P=2^{160}-\alpha$. Thus, the output values $0, 1*\alpha, 2*\alpha, \ldots 31*\alpha$ are residues of the modulo P multiplication of the input values (5-bit values) multiplied by $2^{160}$. Here, $\alpha$ is a value having 54 bits or less, and each input value has five bits. Accordingly, the outputs from the ROM table 308 do not exceed 59 bits. When receiving a read signal from the control unit 16, the ROM table 308 reads out a residue corresponding to the 5-bit value received from the bus 306 and outputs the read residue.

FIG. 4A shows the contents of the ROM table 309. The ROM table 309 shows relationships between 4-bit input values $(0000)_2$ to $(1111)_2$ and output values which are residues of the modulo P multiplication of corresponding input values multiplied by $2^{165}$. In FIG. 4A, the output values $0, 1*32*\alpha, 2*32*\alpha, 3*32*\alpha, \ldots 15*32*\alpha$ are residues of the modulo P multiplication of the input values (4-bit values) multiplied by $2^{165}$. Here, $\alpha$ is a value having 54 bits or less, each input value has four bits, and the value "32" has five bits. Accordingly, the outputs from the ROM table 309 do not exceed 63 bits. When receiving a read signal from the control unit 16, the ROM table 309 reads out a residue corresponding to the 4-bit value received from the bus 307 and outputs the read residue.

As understood from the above description, the residue calculating unit 12 acquires residues utilizing the ROM tables 308 and 309 in terms of a part of the shifted value excluding the lower 160 bits. Accordingly, compared with the conventional construction in which the residues are obtained by subtractions, it is possible with the present invention to obtain the residue at high speed. Also, since two ROM tables are used, each of the ROM tables 308 and 309 stores a small amount of data, where the numbers of input values stored in the tables are respectively $2^5$ and $2^4$. With such arrangements, the residues are obtained at high speed since use of two small-sized tables increases the search speed of a value corresponding to an input value.

The adder 310 adds the 160-bit lower part, the residue of the 5-bit part output from the ROM table 308, and the residue of the 4-bit part output from the ROM table 309 together, and outputs the 161-bit addition result, that is, the residue or the congruent value of the modulo P multiplication of $C(i-1)*2^8$.

Figure 5:
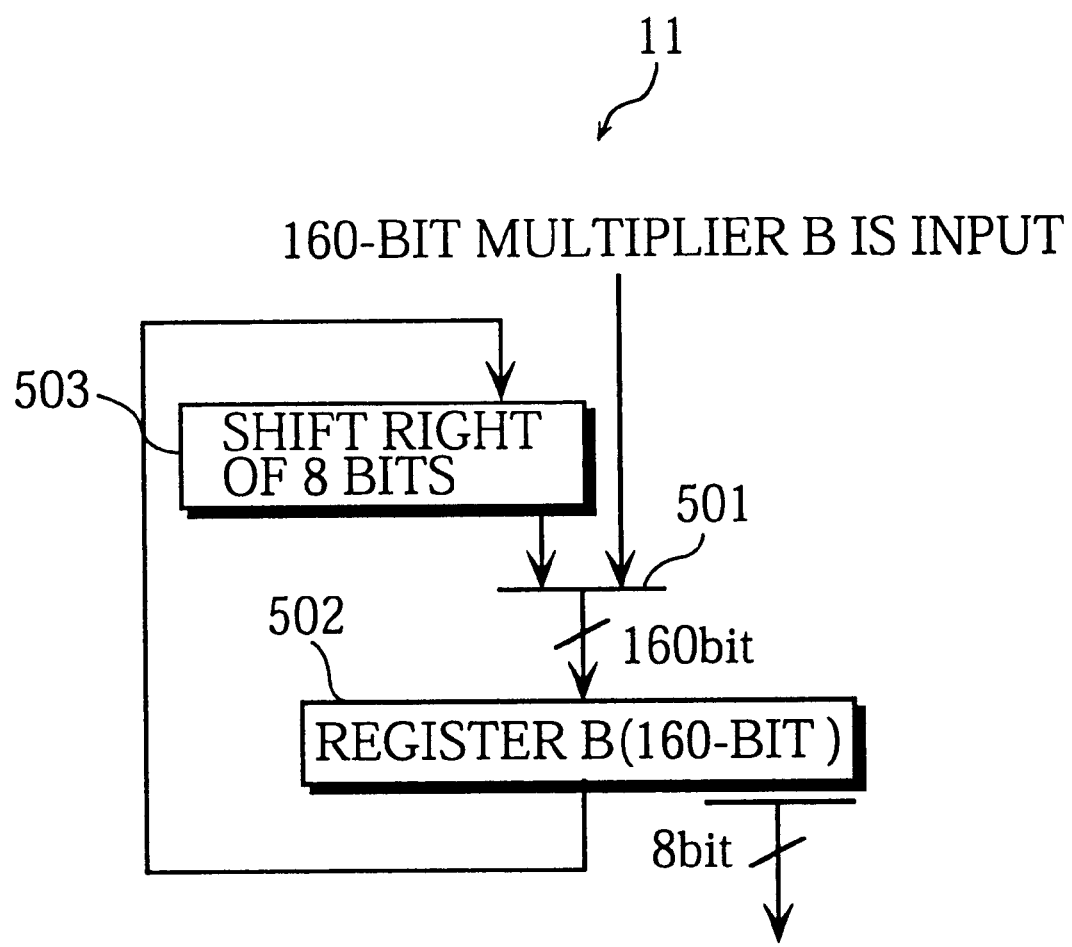
FIG. 5 shows the construction of the multiplier dividing unit 11.

FIG. 5 shows the construction of the multiplier dividing unit 11.

As shown in the drawing, the multiplier dividing unit 11 includes a shifter 503, a selector 501, and a register B 502. The selector 501, under control of the control unit 16, outputs the multiplier B, which is input from outside, to the register B 502 as the initialization when i=1. When $2 \leq i$, the selector 501 outputs the value received from the shifter 503 to the register B 502.

The register B 502, being a 160-bit register, holds the multiplier B received from outside via the selector 501 as the initialization. After the initialization, the register B 502 holds the value received from the shifter 503 via the selector 501. The output of the register B 502 is connected to the shifter 503. Also, the lower 8-bit part is connected to the partial product calculating unit 13. The multiplier dividing unit 11 updates the held value to a new value input from the shifter 503 via the selector 501 in accordance with an instruction from the control unit 16. The value held by the register B 502 is output to the shifter 503. At the same time, the lower eight bits of the value are output to the partial product calculating unit 13.

The shifter 503, having 160 bits in widths, performs a shift right of eight bits on each value input from the register B 502.

With the above-described construction, the multiplier dividing unit 11 outputs partial multipliers of the multiplier B b(i)=b[8i−1:8i−8] (i=1, . . . , 19, 20) to the partial product calculating unit 13 in units of eight bits in order from lower bits.

Figure 6:
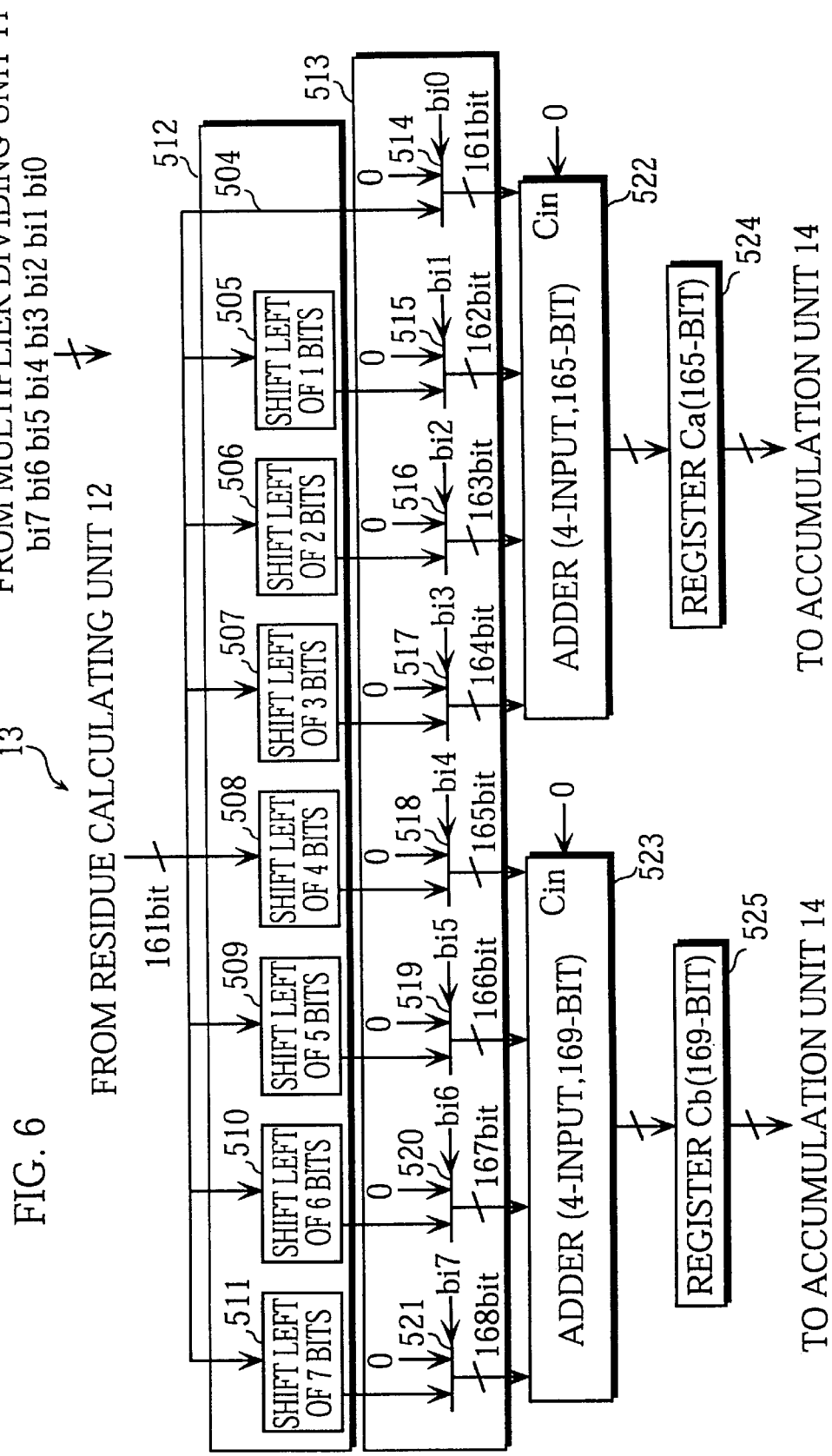
FIG. 6 shows the construction of the partial product calculating unit 13.

FIG. 6 shows the construction of the partial product calculating unit 13.

As shown in the drawing, the partial product calculating unit 13 includes a shifting unit 512, a selector unit 513, an adder 522, an adder 523, a register Ca 524, and a register Cb 525.

Formula 3 below shows the operation performed by the partial product calculating unit 13.

The shifting unit 512, including a bus 504 and shifters 505–511 which respectively perform a shift left of 1 to 7 bits on the input value, performs the operations indicated by sign ①.

The shift unit 512 shifts the intermediate value C(i) received from the residue calculating unit 12 for each of the partial multiplier's bits bi0–bi7 in accordance with the corresponding weights of the bits, and outputs the shifted values to the selector unit 513. The shifters 505–511 respectively perform a shift left of 1 to 7 bits on the input intermediate value C(i) and output $C(i)*2^1$ to $C(i)*2^7$. The bus 504 outputs the input intermediate value C(i) as it is to the selector unit 513.

The selector unit 513, including selectors 514 to 521, performs the operations indicated by sign ②. The selectors 514 to 521 respectively receive $C(i)*2^0$ to $C(i)*2^7$ from the residue calculating unit 12 and also receive the partial multiplier's bits bi0–bi7 from the multiplier dividing unit 11. The selectors 514 to 521 respectively selects 0 or received $C(i)*2^0$ to $C(i)*2^7$ based on the received partial multiplier's bits bi0–bi7, and output the selected values.

More specifically, the selectors 514 to 521 each output $C(i)*2^n$ when the received partial multiplier bin is 1, and output 0 when the value bin is 0, where n=0, 1, 2, . . . 7.

The adder 522 performs the operations indicated by sign ③. That is, the adder 522 adds up the four values received from the selectors 514 to 517, and the addition result value (hereinafter, a partial product a) to the register Ca 524.

The adder 523 performs the operations indicated by sign ④. That is, the adder 523 adds up the four values received from the selectors 518 to 521, and the addition result values (hereinafter, a partial product b) to the register Cb 525.

$$C(i)*b(i) \quad \text{Formula 3}$$

$$= C(i)*(bi7*2^7 + bi6*2^6 + bi5*2^5 + bi4*2^4 + bi3*2^3 + bi2*2^2 + bi1*2^1 + bi0)$$

$$= \underbrace{\left(\underbrace{\dfrac{C(i)*2^7}{①}}_{②} * \underbrace{\dfrac{bi7+C(i)*2^6}{①}}_{②} * \underbrace{\dfrac{bi6+C(i)*2^5}{①}}_{②} * \underbrace{\dfrac{bi5+C(i)*2^4}{①}}_{②} *bi4\right)}_{③} +$$

$$\underbrace{\left(\underbrace{\dfrac{C(i)*2^3}{①}}_{②} * \underbrace{\dfrac{bi3+C(i)*2^2}{①}}_{②} * \underbrace{\dfrac{bi2+C(i)*2^1}{①}}_{②} * \underbrace{\dfrac{bi1+C(i)}{①}}_{②} *bi0\right)}_{④}$$

Note that in Formula 3, the binary notation of the partial multipliers b(i) input from the multiplier dividing unit 11 is denoted as bi7bi6bi5bi4bi3bi2bi1bi0, for the sake of conveniences.

As shown in the formula, the partial product calculating unit 13 shifts the intermediate value C(i) received from the residue calculating unit 12 for each of the partial multiplier's bits bi0–bi7 by corresponding bits of 0 to 7 bits (indicated by sign ①). The partial product calculating unit 13 then multiplies the shifted values C(i) respectively by corresponding partial multiplier's bits bi0–bi7 (indicated by sign ②). Finally, the partial product calculating unit 13 adds up the multiplication result values (indicated by signs ③ and ④).

The registers Ca 524 and Cb 525 respectively hold the partial products a and b, and update these values to newly input values under control of the control unit 16. The outputs of the registers Ca 524 and Cb 525 are connected to the accumulation unit 14, and the partial products a and b are respectively output from the registers Ca 524 and Cb 525 to the accumulation unit 14.

The sum of the partial products a and b is equal to the partial product C(i)*b(i).

Figure 7:
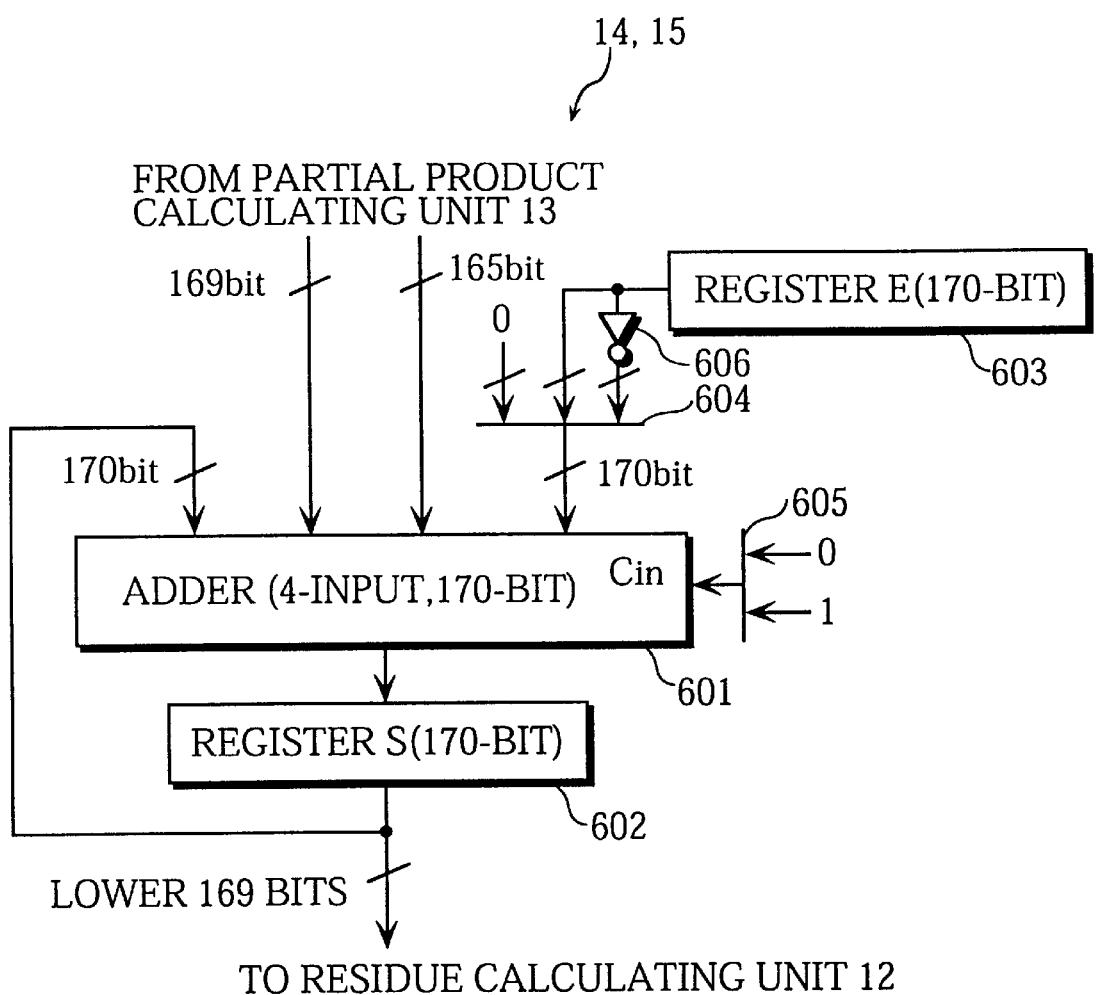
FIG. 7 shows the construction of the accumulation unit 14 and correction unit 15.

FIG. 7 shows the construction of the accumulator unit 14 and correction unit 15.

The accumulation unit 14 includes an adder 601 and a register S 602.

The register S 602, being a 170-bit register, holds an accumulated value, and updates the value to a value input from the adder 601 under control of the control unit 16. The MSB of the register S 602 is regarded as a sign bit which indicates whether the accumulated value is positive or negative.

The adder 601 adds up the accumulated value receiver from the register S 602, the partial products a and b respectively received from the registers Ca 524 and Cb 525, and a correction value received from the correction unit 15, and outputs the sum to the registers S 602.

The correction unit 15 includes a register E 603, selectors 604 and 605, and an inverter 606.

The register E 603 holds a multiple of P, the multiple of P being larger than and the closest to the maximum value of the sum of the partial products a and b. The value held by the register E 603 is denoted as 510*P.

The inverter 606 outputs an inverted value of 510*P, where the inverted value is denoted as −510*P.

The selector 604, under control of the control unit 16, selects either 510*P or −510*P as a correlation value and outputs the selected value to the adder 601.

The selector 604 outputs 0 or 1 to the adder 601 under control of the control unit 16.

In the above-described procedure, the control unit 16 perform a control so that the selector 604 selects a correction value and the selector 605 selects 0 or 1 in accordance with the sign of the accumulated value held in the register S 602 and that the selected values are output to the adder 601.

More specifically, the control unit 16 allows the selector 604 to select −510*P and allows the selector 605 to select 1 when the MSB of the register S 602 is 0. That is, when the accumulated value stored in the register S 602 is positive (MSB=0), the adder 601 receives the value −510*P from the register E 603 via the inverter 606 and selector 604, and receives 1 via the selector 605. With this arrangement, in the next addition performed by the adder 601, the value 510*P is subtracted, preventing the occurrence of an overflow in the adder 601 and the register S 602.

The control unit 16 allows both selectors 604 and 605 to select 0 when the accumulated value stored in the register S 602 is negative (MSB=1).

The control unit 16 judges whether the accumulated value stored in the register S 602 is positive or negative by referring to the MSB after the loop has been repeated as specified (i=1, 2, . . . 20) and the accumulated value is updated the last time. When the value is negative (MSB=1), the control unit 16 allows the selector 604 to select 510*P and allows the selector 605 to select 0, allowing the adder 601 to add 510*P to the accumulated value stored in the register S 602 as a correction. Thus, the control unit 16 performs a correction so that the accumulated value is finally positive. Also, when the last accumulated value is positive (MSB=0), the control unit 16 allows both selectors 604 and 605 to select 0 so that no correction is made to the last accumulated value.

Embodiment 2

The second embodiment of the modular multiplication apparatus of the present invention will be described with reference to the drawings.

On receiving a multiplicand A (160 bits) and a multiplier B (161 bits), the modular multiplication apparatus acquires a residue R (=A*B mod P, where P has 160 bits), or acquires a value being congruent with the residue R in the modulo p multiplication, where the modulus P is a value satisfying $P=2^{160}-\alpha$ when α has 54 bits or less.

The modular multiplication apparatus of the present embodiment is, like Embodiment 1, adapted to Formula 2. However, in Embodiment 2, s is 9 while in Embodiment 1, s is 8. Also, k/s is replaced by 18 since k is not divisable by s (161/9).

Figure 8:
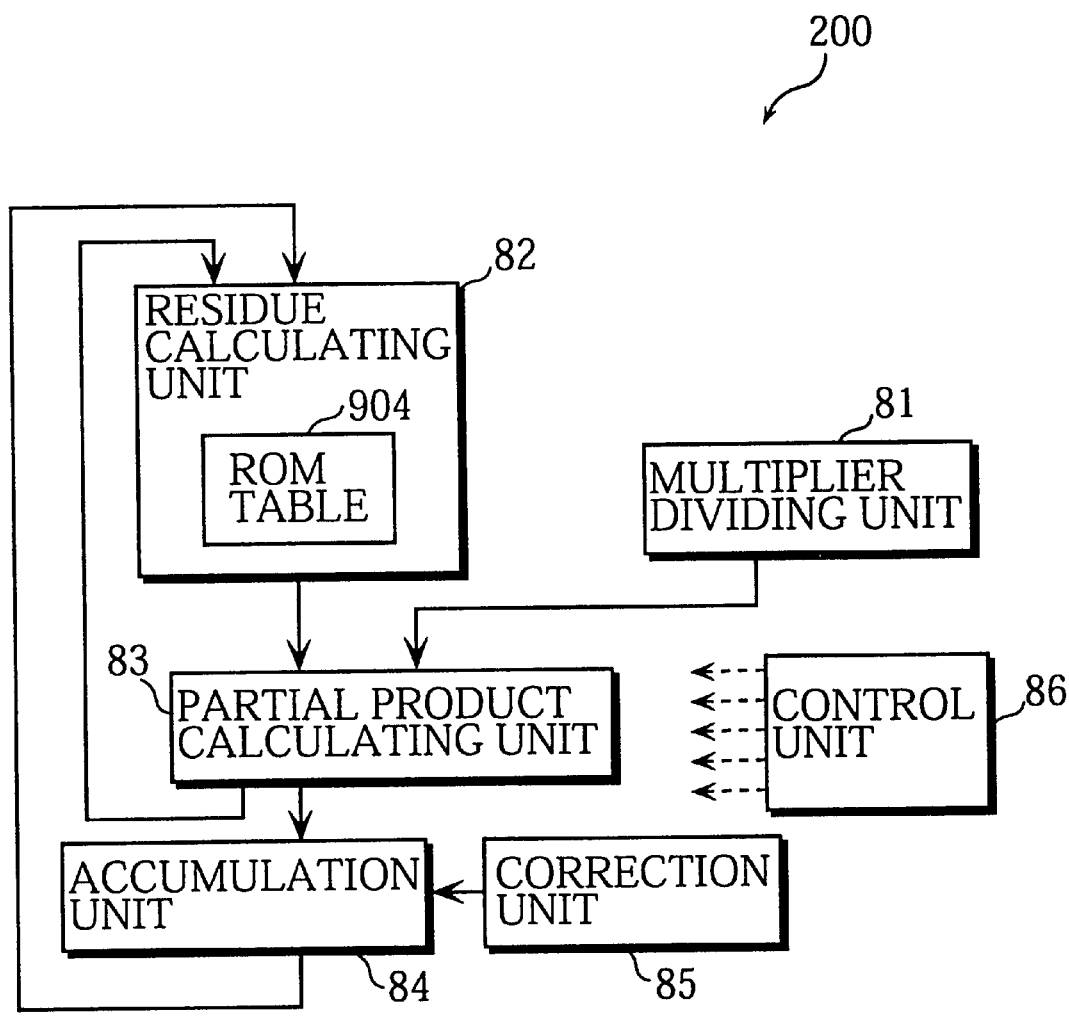
FIG. 8 is a block diagram showing the construction of a modular multiplication apparatus 200 in Embodiment 2.

FIG. 8 is a block diagram showing the construction of a modular multiplication apparatus 200 in Embodiment 2.

As shown in the drawing, the modular multiplication apparatus 200 includes a multiplier dividing unit 81, a residue calculating unit 82, a partial product calculating unit 83, an accumulation unit 84, a correction unit 85, and a control unit 86.

In the modular multiplication apparatus 200, the residue calculating unit 92 differs from the residue calculating unit 12 of Embodiment 1 in that is has only one ROM table. Also, the partial product calculating unit 83 includes adders whose circuit size is smaller than those of the partial product calculating unit 13 of Embodiment 1. This is achieved by reducing the number of inputs in each adder. Furthermore, while the residue calculating unit 12 calculates shifted values $C(i-1)*2^8$ in Embodiment 1, the partial product calculating unit 83 calculates shifted values $C(i-1)*2^9$ in Embodiment 2.

The multiplier dividing unit 81, accumulation unit 84, correction unit 85, and control unit 86 respectively have the same construction as the corresponding units of Embodiment 1 except that they have different numbers of input/output bits and registers, shifters, adders or the like with different bits since the multiplicand B is 161-bit and value s is 9-bit.

The multiplier dividing unit 81 outputs the partial multipliers b(i)=b[9i−1:9i−9] (i=1, . . . 17, 18) of the multiplier B in units of nine bits in ascending order.

The residue calculating unit 82 recurrently calculates the intermediate values C(i) (i=1, . . . 17, 18). First, that is, when i=1, the residue calculating unit 82 outputs the multiplicand A as an intermediate value C(1). At the second time and after, the residue calculating unit 82 calculates intermediate values C(i) (i=2, . . . 17, 18) from the modulo P multiplication of $C(i-1)*2^9$, the value $C(i-1)*2^9$ being equivalent to the preceding intermediate value shifted nine bits. More specifically, the residue calculating unit 82 acquires as the intermediate values C(i) the multiplicand A (first time), $A*2^9$ mod P (second time), $(A*2^9$ mod P$)*2$ mod P (third time), $((A*2^9$ mod P$)*2$ mod P (fourth time), . . . It should be noted here that the residue calculating unit 82 does not perform the shift of nine bits on the intermediated values (i−1), but obtains residues by calculating the modulo p multiplication of $C(i-1)*2^9$ using the shifted values $C(i-1)*2^9$ which are calculated by the partial product calculating unit 83.

To speed up the calculation of the residue, the residue calculating unit 82 includes a ROM table 904. The ROM table 904 prestores the residues corresponding to the bits of the shifted values $C(i-1)*2^9$ excluding the lower 160-bits. The residue calculating unit 82 calculates the intermediate values C(i): by obtaining the residues corresponding to the bits of the shifted values $C(i-1)*2^9$ excluding the lower 160 bits by referring to the ROM table 904; and by calculating the lower 160 bits of the shifted values $C(i-1)*2^9$.

The partial product calculating unit 83 outputs partial products C(i)*b(i) which are obtained by multiplications of the intermediate values c(i) output from the residue calculating unit 82 and partial multipliers b(i) output from the multiplier dividing unit 81. The partials product calculation unit 83 shifts the intermediate values C(i-1) received from the residue calculating unit 82 by nine bits and outputs the shifted values to the residue calculating unit 82.

The accumulating unit 84 accumulates the partial products C(i)*b(i) received from the partial product calculating unit 83.

The correction unit 85 corrects the accumulated value by adding or subtracting an integral multiple of P to/from the accumulated value output from the accumulation unit 84 to prevent the occurrence of overflow in the accumulation unit 84.

The control unit 86 controls a process in which the units 81 to 85 repeat an operation 18 times when i=1 to 18. Furthermore, the control unit 86 controls a pipeline process which is composed of three stages: first stage in which the residue calculating unit 82 calculates intermediate values and the multiplier dividing unit 81 calculates partial multipliers; second stage in which the partial product calculating unit 83 calculates partial products; and third stage in which the accumulation 84 accumulates the partial products and the correction unit 85 corrects the accumulated value. The control unit 86 further inputs the last-accumulated value to the residue calculating unit 82 to let the unit 82 calculate the residue of the value when the value is greater than P.

Figure 9:
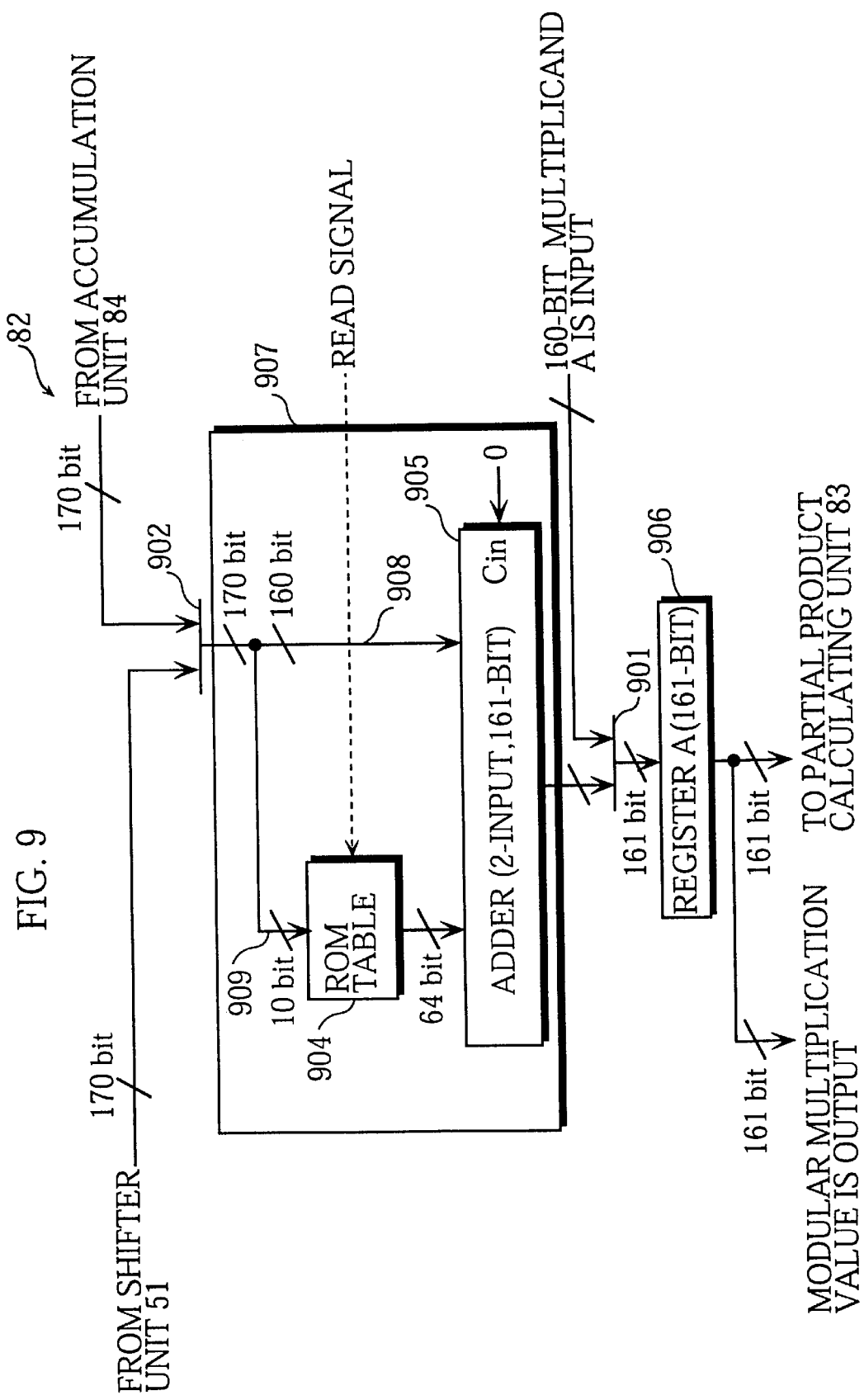
FIG. 9 shows the construction of the residue calculating unit 82.

FIG. 9 shows the construction of the residue calculation unit 82.

As shown in the drawing, the residue calculating unit 82 includes selectors 901 and 902, a register A 906, and a residue operation unit 907.

The selector 901, under control of the control unit 86, outputs the multiplicand A, which is received from outside, to the register A 906 as the initialization when i=1. After the initialization (i=2, . . . 17, 18), the selector 901 outputs the intermediate value C(i), which is received from the residue operation unit 907, to the register A 906.

The register A 906, being a 161-bit register, holds the multiplicand A (C=CI1)) received from outside via the selector 901 as the initialization when i=1. After the initialization (i=2, . . . 17, 18), the register A 906 holds the intermediate value C(i) received from the residue operation unit 907 via the selector 901. The register A 906, whose output is connected to the partial product calculating unit 83, updates the intermediate value to a newly input intermediate value in accordance with an instruction from the control unit 86, and outputs the updated intermediate value to the partial product calculating unit 83. The register A 906 finally holds the modular multiplication value R.

During the loop process, the selector 902 receives the shifted value $C(i-1)*2^9$ from the partial product calculating unit 83 and outputs the received value to the residue operation unit 907. After the loop process is complete, the selector 902 receives the accumulated value from the accumulation unit 84 and outputs the received value to the residue operation unit 907.

The residue operation unit 907, including a ROM table 904 and an adder 905, outputs either a residue or a congruent value of the modulo P multiplication of a 170-bit value selected by the selector 902, the selected value being either a 170-bit shifted value $C(i1)-2^9$ sent from the partial product calculating unit 83, or the accumulated value sent from the accumulating unit 84. This residue or congruent value has 161 bits.

The residue operation unit 907 also includes buses 908 and 909, where the bus 908 is used to input the lower 160 bits of the 170bit value received from the selector 902 to the adder 905, and the bus 909 is used to input the higher 10 bits (the $161^{st}$ bit to the $170^{th}$ bit) excluding the lower 160 bits to the ROM table 904. These buses are used to divide the 170-bit value into a 160-bit part (lower part) and a 10-bit part (higher part) and output these parts respectively to the adder 905 and the ROM table 904.

FIG. 10 shows the contents of the ROM table 904.

As shown in the drawing, the ROM table 904 shows relationships between 10-bit input values $(0000000000)_2$ to $(1111111111)_2$ and output values which are residues of the modulo P multiplication of corresponding input values multiplied by $2^{160}$. When receiving a read signal from the control unit 86, the ROM table 904 reads out a residue corresponding to the 10-bit value received from the bus 909 and outputs the read residue.

The adder 905 adds a residue corresponding to the higher bits of the shifted value $C(i-1)*2^9$ received from the ROM table 904 to the lower bits of the shifted value, and outputs the 161-bit addition result, that is, the residue or the congruent value of the modulo P multiplication of $C(i-1)*2^9$.

As apparent from the above description, the residue operation unit 907 uses the ROM table 904 to obtain a partial residue corresponding to the higher bits excluding lower 160 bits after a shift of nine bits, and obtains the residue or the congruent value of the modulo P multiplication of $C(i-1)*2^9$ by adding the partial residue to the lower 160 bits.

If the residue operation unit 907 had the construction of the conventional residue calculating unit 3, the residue operation unit 907 would repeat the loop (steps 6–8) explained earlier in Description of the Prior Art several times, taking much time to calculate the residue. In contrast, the residue operation unit 907 of the present embodiment performs the same at a higher speed since the unit is only required to perform one reference to the ROM table 904 and one addition by the adder 905.

Figure 11:
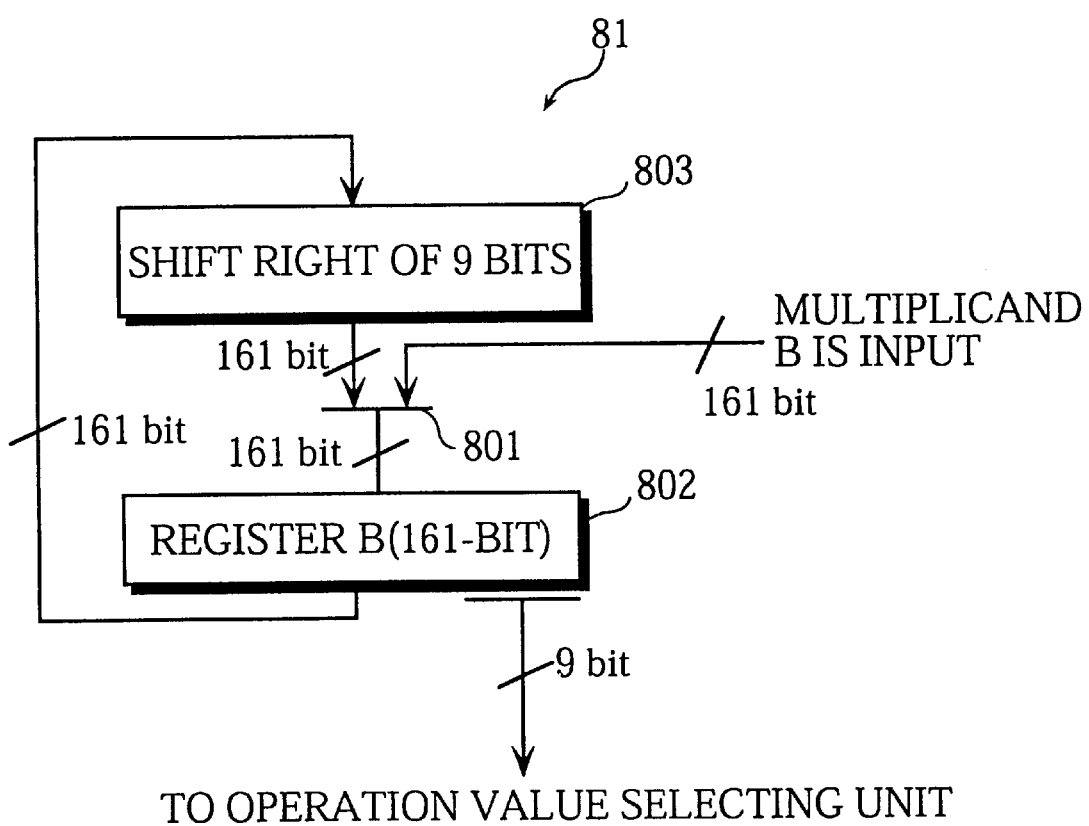
FIG. 11 shows the construction of the multiplier dividing unit 81.

FIG. 11 shows the construction of the multiplier dividing unit 81.

As shown in the drawing, the multiplier dividing unit 81 includes a selector 801, a register B 802, and a shifter 803.

The selector 801, under control of the control unit 86, outputs the multiplier B, which is input from outside, to the register B 802 as the initialization when i=1. When i=1, . . . 17, 18, the selector 801 outputs the value received from the shifter 803 to the register B 802.

The register B 802, being a 161-bit register, holds the multiplier B received from outside via the selector 801 as the initialization. After the initialization, the register B 802 holds the value received from the shifter 803 via the selector 801. The output of the register B 802 is connected to the shifter 803. Also, the lower 9-bit part is connected to the partial product calculating unit 83. The register B 802 updates the held value to a new value input from the shifter 803 via the selector 801 in accordance with an instruction from the control unit 86. The value held by the register B 802 is output to the shifter 803. At the same time, the lower nine bits of the value are output to the partial product calculating unit 83.

The shifter 803, having 161 bits in width, performs a shift right of nine bits on each value input from the register B 802.

With the above-described construction, the residue calculating unit 82 outputs partial multipliers of the multiplier b(i)=[9i-1:9i-9](i=1, . . . 17, 18) to the partial product calculating unit 83 in units of nine bits in order from lower bits.

Partial Product Calculation Methods

Before the construction of the partial product calculating unit 83 is explained, two methods for calculating the partial product will be described here since the construction of the unit is based on the two methods.

The product of a multiplicand X and a 3-bit multiplier y is obtained by Formula 4 shown below. Here, the binary notation of the 3-bit multiplier y is denoted as Y2y1y0.
Formula 4

$$X*Y=X*(y2*2^2+y1*2^1+y0*2^0) =X*y2*2^2+X*y1*2^1+X*y0*2^0= X*2^2*y2+X*2^1*y130\ X*2^0*y0$$

As shown in Formula 4, the product $X*Y$ is obtained by multiplying the multiplicand X by the weight of each bit of the multiplier Y ($2^2$, $2^1$, $2^0$) and also by each corresponding bit (y2, y1, y0), and adding up the results ($X*y2*2^2$, $X*y1*2^0$, $X*y1*2^0$, where each of these products is hereinafter called bit product).

More specifically, for example, when $Y=(101)_2$ or $Y=(110)_2$, the product $X*Y$ is equivalent to a sume of two bit products which is represented as $X*Y=X*2^2*y2+X*2^0*y0$, or $X*Y=X*2^2*y2+X*2^1*y1$. Also, when $Y=(111)_2$, the product $X*Y$ is equivalent to a sum of three bit products which is represented as $X*Y=X*2^2*y2+X*2^1*y1+X*2^0*y0$.

In the present embodiment, the above method is referred to as general calculation method in which the product is obtained by multiplying the multiplicand, the weight of each bit of the multiplier, and each corresponding bit of the multiplier to obtain bit products, and adding up the bit products. The construction of the residue calculating unit 12 in Embodiment 1 is also based on the general calculation method.

Meanwhile, $(111)_2=2^3-1$. Thus, the product $X*Y$ can be obtained by $X*(2^3-1)$ when $Y=(111)_2$. The product of $X*(2^3-1)$ is obtained by the following Formula 5.
Formula 5

$$X*Y=X*(111)_2=X*(2^3-1)=X*2^3-X$$

That is to say, the product $X*Y$ is obtained by subtracting the multiplicand X from the product of $X*2^3$ when $Y=(111)_2$.

Furthermore, when $Y'=(111000)_2$, $Y'=(2^3-1)*2^3$. Thus, the product $X*Y'$ can be obtained by $X*(2^6-2^3)$ when $Y'=(111000)_2$.

It is generalized form the above description that when all binary digits in the places form $2^p$ to $2^1$ of the multiplier are all "1," the product of the multiplicand X multiplied by the part of the multiplier is obtained by subtracting the product of $X*2^q$ (hereinafter referred to as minuend) from the product of $X*2^{p+1}$ (hereinafter referred to as subtrahend), where p >q. In the present embodiment, this method is referred to as special calculation method.

Meanwhile, in practice, the adder obtains a result of subtraction s-t by adding up s, and inverted value of t (one's complement), and constant 1. Accordingly, when all binary digits in the places from $2^p$ and $2^q$ of the multiplier are all "1," the adder can obtain the product of the multiplicand X multiplied by the part of the multiplier by adding up $X*P^{p+1}$, the inverted value of $^qX*2$ (also merely referred to as inverted value), and constant 1. In doing so, the adder may achieve the addition of constant 1 by using the carry-in of the lower bit. That is to say, the adder can obtain the product by performing two additions and one carry-in using the special calculation method.

In contrast, with the general calculation method, the same result is obtained by performing the addition of bit products n times when all bits of n-bit multipliers are 1.

It is understood from the above description that the use of the special calculation method for a part of the multiplier composed of three or more continuous "1" allows the adder to obtain the same result with less number of additions than the use of the general calculation method. This reduces the size of the adder and also reduces the amount of addition operation performed in the adder.

End of Partial Product Calculation Methods

The partial product calculating unit 83 calculates the partial product $C(i)*b(i)$ using the above-described two methods.

The partial product calculating unit 83 applies the special calculation method to a part of the multiplier composed of three or more continuous "1" and applies the general calculation method to the other part. More specifically, when the multiplier 9-bit, the partial product calculating unit 83 applies the special calculation method to the following cases of the partial multiplier b(i): $(111111111)_2$; higher or lower six bits (111111); and higher, middle, or lower three bits $(111)_2$. The partial product calculating unit 83 applies the general calculation method to the other cases.

For example, when the partial multiplier b(i) is $111111011)_2$, the partial product calculating unit 83 calculates the partial product $C(i)*b(i)$ applying the special calculation method to the higher six bits $(111111)_2$, and the general calculation method to the lower three bits $(011)_2$. Here, since the higher six bits $(1111111)_2$ should be shifted left 3 bits (multiplied $2^3$), the partial product calculating unit 83 performs this shift before applying the special calculation method.

More specifically, the above shift is achieved by the following Formula 6.

When $b(i) = (111111011)_2$, \hfill Formula 6

$$C(i)*b(i) = C(i)*(111111011)_2$$
$$= [C(i)*(111111)_2 * 2^3] + (C(i)*(011)_2)$$
$$= [C(i)*(2^6 - 1) * 2^3] + (C(i)*(011)_2)$$
$$= (C(i)*2^9 - C(i)*2^3) + C(i)*2^2 * 0 +$$
$$C(i)*2^1 * 1 + C(i)*2^0 * 1$$
$$= \frac{[(C(i)*2^9 + \neg (C(i)*2^3) + 1]}{①} +$$
$$\frac{[C(i)*2^1 + C(i)]}{②}$$

(the sign ¬ indicates the inverted value)

In the above formula, the part indicated by sign ① is a result of the application of the special calculation method and a shift by multiplication of $2^3$. That is, the partial product calculating unit 83 calculates the partial product on the higher 6-bit part $(111111)_2$ by adding up the intermediate value C(i) shifted by nine bits, the inverted value of C(i) shifted by three bits, and constant 1. Also, the part indicated by the sign ② is a result of the application of the general calculation method to the lower 3-bit part $(011)_2$. That is, the partial product calculating unit 83 calculates the partial product on the part by adding up the products of the intermediate product on the part by adding up the products of the intermediate value C(i), a bit value, and a corresponding bit weight.

Figure 12:
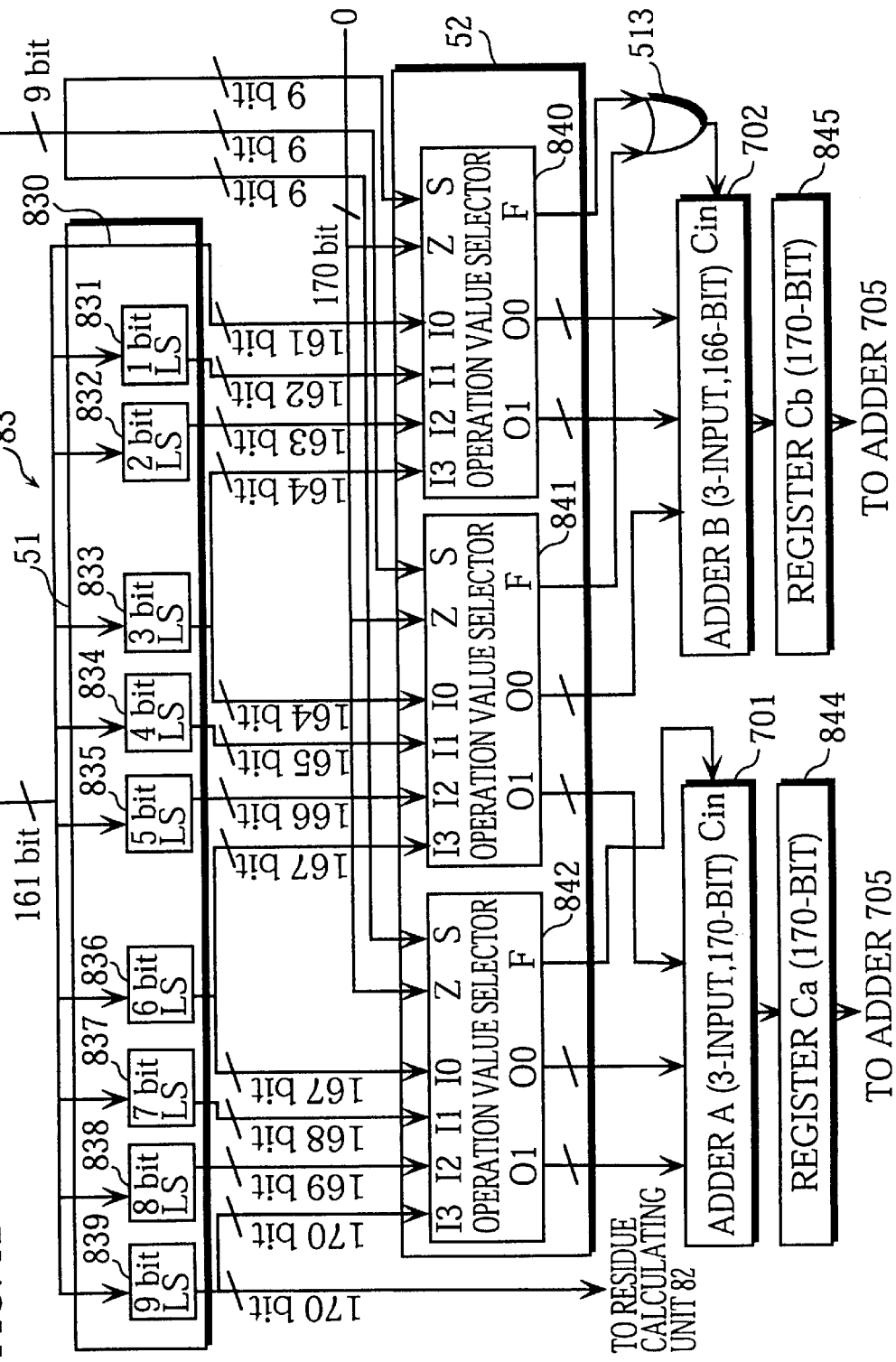
FIG. 12 shows the construction of the partial product calculating unit 83.

FIG. 12 shows the construction of the partial product calculating unit 83.

As shown in the drawing, the partial product calculating unit 83 includes a shifter unit 51, a selection unit 52, an OR circuit 513, an adder A 701, an adder B 702, a register Ca 844, and a register Cb 845.

The includes a bus 830 and shifters 831–839. The bus 830 outputs the input 161-bit intermediate value C(i) as it is to the selection unit 52. The shifters 831–839 respectively perform a shift left of 1 to 9 bits on corresponding bit of the input value C(i) and outputs each shifted bit value to the selection unit 52, where the shifted bits are $C(i)*2$, $C(i)*2^2$, $C(i)*2^3$, $C(i)*2^4$, $C(i)*2^5$, $C(i)*2^6$, $C(i)*2^7$, $C(i)*2^8$, $C(i)*2^9$. The shifter 839 outputs $C(i)*2^9$ to the residue calculating unit 82 as a shifted value $C(i-1)*2^9$, as well as to the selection unit 52.

In shifter unit 51, the outputs from the bus 830 and shifters 831–838, namely, $C(i)$, $C(i)*2^1$, . . . $C(i)*2^8$ are used as candidates for the bit product in the general calculation method. The outputs from the shifters 833, 836, and 839, namely, $C(i)*2^3$, $C(i)*2$, and $C(i)*2$ are used as candidates for the minuend in the special calculation method. Also, the outputs from the bus 830 and the shifters 833 and 836, namely, $C(i)$, $C(i)*2^3$, and $C(i)*2$ are used as candidates for the subtrahend in the special calculation method. Hereinafter, these candidates are called candidate values.

On receiving the values shifted 0–9 bits from the shifter unit 51 and also receiving the partial multiplier b(i) from the multiplier dividing unit 81, the selection unit 52 judges whether: the 9-bit partial multiplier b(i) is $(111111111)_2$; higher or lower six bits of the partial multiplier b(i) is $(111111)_2$; and higher, middle, or lower three bits of the partial multiplier b(i) is $(111)_2$. The selection unit 52 then based on the judgment result selects several candidate values among those input from the shifter unit 51. More specifically, the selection unit 52 selects the minuend and subtrahend among the candidate values of the parts judged as positive. The selection unit 52 selects the bit product among the candidate values of the parts judged as negative. The selection unit 52 outputs the minuend and the bit product out of the selected candidate values to the adder A 701 or to the adder B 702 as it is. The selection unit 52 generates the inverted value of the subtrahend in the selected candidate values and also generates constant 1, and outputs the generated values to the adder A 701 or to the adder B 702.

The selection unit 52 includes operation value selectors 840, 841, and 842.

Figure 13:
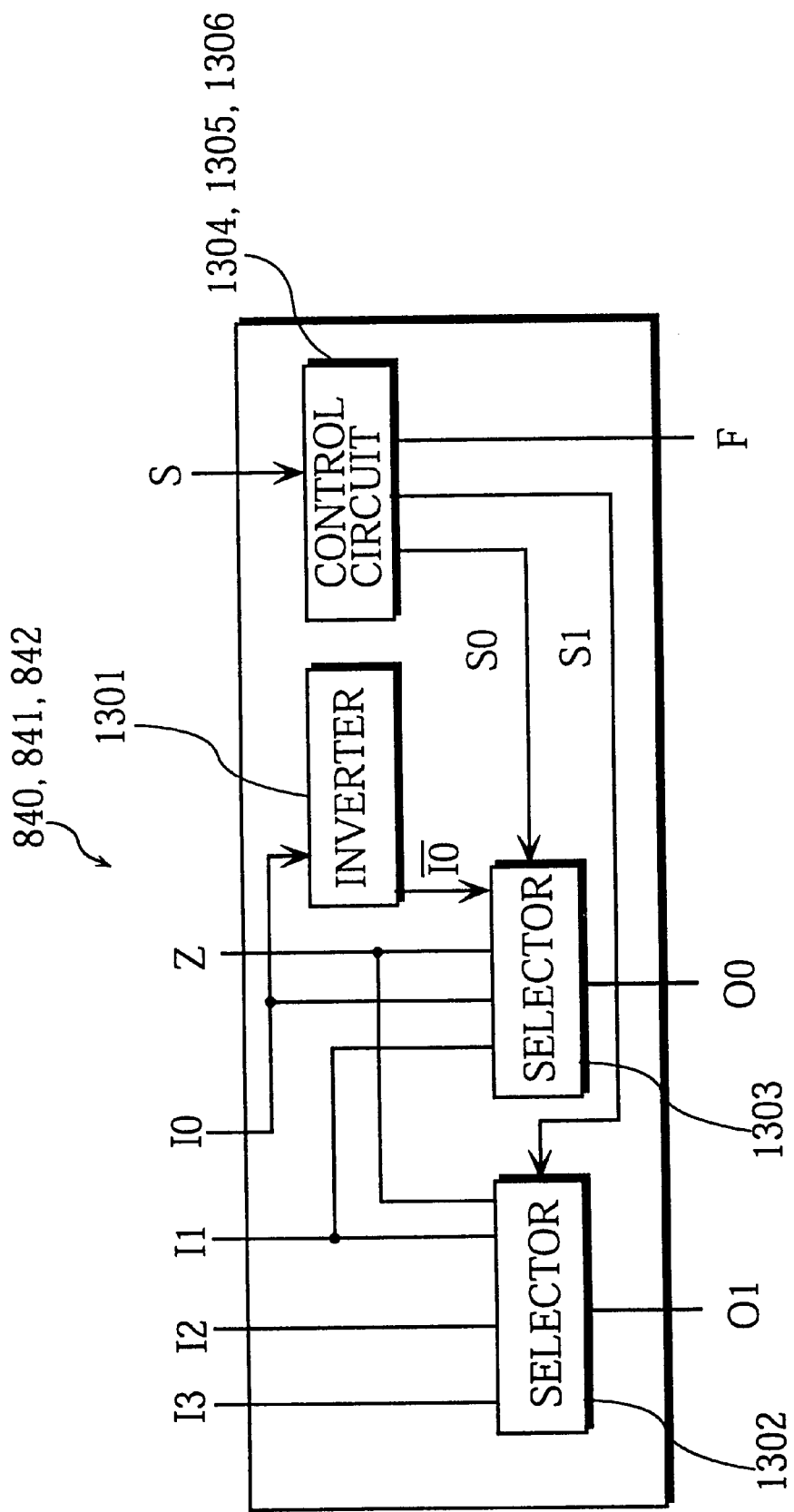
FIG. 13 shows the construction of the operation value selectors 840, 841, and 842.

FIG. 13 shows the construction of the operation value selectors 840, 841, and 842.

The operation value selector 840 includes an inverter 1301, selectors 1302 and 1303, and control circuit 1304. The operation value selector 840 also includes input terminals S, Z, I0, I1, I2, and I3, and output terminals F, O0, and O1.

The inverter 1301, on receiving the subtrahend as the candidate value C(i) from the input terminal I0, outputs the inverted value of the subtrahend to the selector 1303.

The selector 1303, on receiving the inverted value of the candidate value C(i) from the inverter 1031 via the input terminal I0, 0 from the input terminal Z, the candidate value C(i) from the input terminal I0, and the candidate value $C(i)*2^1$ from the input terminal I1, selects one out of these values in accordance with the input/output logic of the control circuit 1304, and outputs the selected value through the output terminal O0.

The selector 1302, on receiving 0 from the input terminal Z, the candidate value $C(i)*2^1$ from the input terminal I1, the candidate value $C(i)*2^2$ from the input terminal I2, and the candidate value $C(i)*^3$ from the input terminal I3, selects one out of these values in accordance with the input/output logic of the control circuit 1304, and outputs the selected value through the output terminal O1.

The control circuit 1303, on receiving the partial multiplier b(i) from the input terminal S, allows each of the selectors 1302 and 1303 to select one input terminal in accordance with the input/output logic shown in FIG. 14C and output, through the output terminal O1 and O0, the value that is input through the selected input terminal. Also, the control circuit 1304 outputs 1 through the output terminal F when allowing the selectors 1303 to select input terminal - I0. Otherwise, the control circuit 1304 outputs ) through the output terminal F.

FIG. 14C shows the partial multiplier b(i) input to the control circuit 1304 and the input/output logic.

In FIG. 14C, the leftmost column (y[]y[7]y[6]y[5]y[4]y[3]y[2]y[1]y[0]) shows the partial multiplier b(i) input through the input terminal S. In this column, the "-" indicates an arbitrary value of 1or 0, and "###" indicates arbitrary values other than $(111)_2$. The second column from left shows the input terminal selected by the selector 1302. The third column from left shows the input terminal selected by the selector 1303. The rightmost column shows the value output by the control circuit through the output terminal F. In this column, "1" indicates constant 1.

For example, when having judged that the lower 6 bits of the partial multiplier b(i) are all 1, the control circuit 1304 allows the output terminal O1 to output 0, the output terminal O0 to output the inverted value of C(i), and the output terminal F to output constant 1. When having judged that the lower 6 bits are not all 1 but the lower 3 bits are all 1, the control circuit 1304 allows the output terminal O1 to output $C(i)*2^3$, the output terminal O0 to output C(i), and the output terminal F to output constant 1. In the other cases, the control circuit 1304 allows the output terminals O1 and O0 to output any combination of two values out of $C(i)*2^2$, $C(i)*2^1$, C(i), and 0 in accordance with the lower three bits of the partial multiplier b(i).

The operation value selector 841 includes an inverter 1301, selectors 1302 and 1303, and a control circuit 1305. The operation value selector 841 also includes input terminals S, Z, I0, I1, I2, and I3, and output terminals F, O0, and O1. The operation value selector 841 differ from the operation value selector 840 in that it includes the control circuit 1305 instead of the control circuit 1304. The control circuit 1305, on receiving the partial multiplier b(i) from the input terminal S, allows each of the selectors 1302 and 1303 to select one input terminal in accordance with the input/output logic shown in FIG. 14B and output, through the output terminal O1 or O0, the value that is input through the selected input terminal. The other components of the operation value selector 841 are the same as those of the selector 840, with no further explanation of those components being given.

The operation value selector 842 includes an inverter 1301, selectors 1302, and 1303, and a control circuit 1306. The operation value selector 842 also includes input terminals S, Z, I0, I1, I2, and I3, and output terminals F, O0, and O1. The operation value select 842 differ from the operation value selector 840 in that it includes the control circuit 1306 instead of the control circuit 1304. The control circuit 1306, on receiving the partial multiplier b(i) from the input terminal S, allows each of the selectors 1302 and 1303 to select one input terminal in accordance with the input/output logic shown in FIG. 14A and output, through the output terminal O1 or O0, the value that is input through the selected input terminal. The other components of the operation value selector 842 are the same as those of the selector 840, which no further explanation of those components being given.

The OR circuit 513 carries out the logical sum between two output values output from the operation value selectors 840 and 841 through the output terminal F. As understood from FIGS. 14B and 14C, when one of the output values output from the operation value selectors 840 and 841 through the output terminal F is constant 1, the other is always 0. Thus, the OR circuit 513 reduces the number of values output from the selection unit 52 by carrying out the logical sum between two output values and outputting one value.

The adder A 701 adds up the output values output from the operation value selector 842 through the output terminals 01, 00, and F, and the output value output from the operation value selector 841 through the output terminal 01, and outputs the sum, which is the partial product c, to the register Ca 844.

The adder B 702 adds up the output value output from the operation value selector 841 through the output terminal O0, the output values output from the operation value selector 840 through the output terminals O1 and O0, and the output value output from the OR circuit 513, and outputs the sum, which is the partial product d, to the register Cb 845.

Here, the sum of the partial products c and d is denoted as the partial product C(i)*b(i).

The registers Ca 844 and Cb 845 respectively store the partial products c and d, and updates these values to new partial products under control of the control unit 86. The outputs of the registers Ca 844 and Cb 845 are connected to the accumulation unit 84, and the partial products c and d are respectively output from the registers Ca 524 and Cb 525 to the accumulation unit 84.

Figure 15:
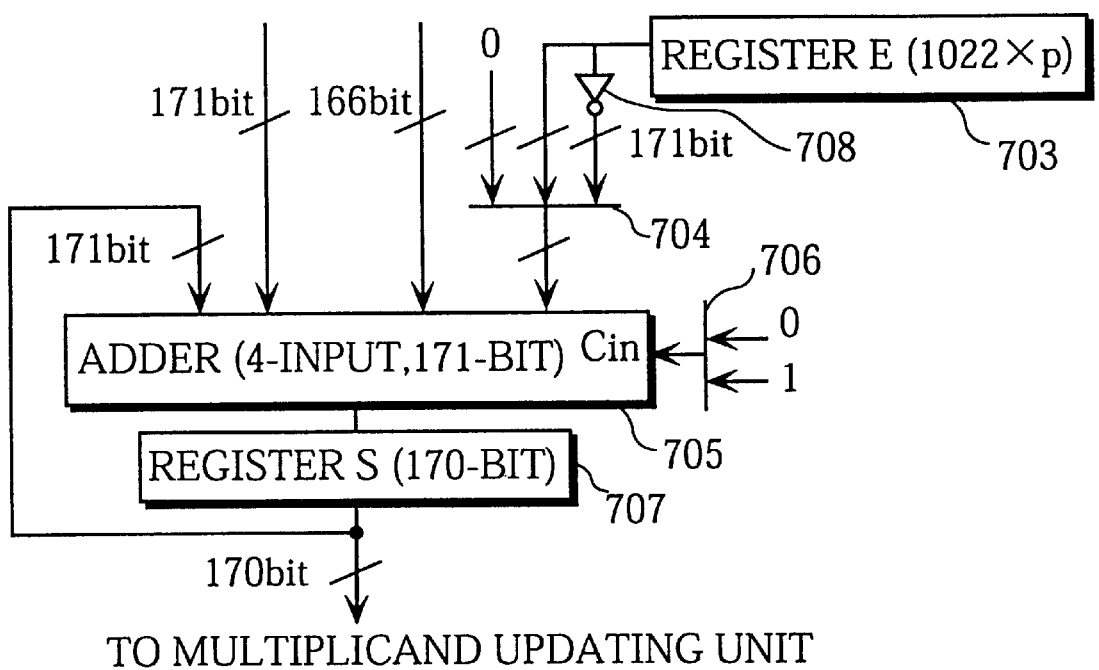
FIG. 15 shows the construction of the accumulation unit 84 and correction unit 85.

FIG. 15 shows the construction of the accumulation unit 84 and the correction unit 85.

The accumulation unit 84 includes an adder 705 and a register S 707.

The register S 707, being a 171-bit register, holds an accumulated value, and updates the value to a value input from a selector 706 under control of the control unit 86. The MSB of the register S 707 is regarded as a sign bit which indicates whether the accumulated value is positive or negative.

The adder 705 adds up the accumulated value received from the register S 707, the partial products c and d respectively received from the registers Ca 844 and Cb 845, and a correction value received from the correction unit 85, and outputs the sum to the register S 707.

The correction unit 85 includes a register E 703, selectors 704 and 706, and an invertor 708.

The register E 703 holds a multiple of P, the multiple of P being larger than and the closet to the maximum value of the sum of the partial products c and d. The value held by the register E 703 is denoted as 1022*P.

The inverter 708 outputs an inverted value of 1022*P, where the inverted value is denoted as −1022*P.

The selector 704, under control of the control unit 86, selects one out of 0, 1022*P, and −1022*P as a correction value and outputs the selected value to the adder 705.

The selector 706 outputs 0 or 1 to the adder 705 under control of the control unit 86. Here, the control unit 86 perform a control so that the selector 704 selects a correction value and the selector 706 selects 0 or 1 in accordance with the sign of the accumulated value head in the register S 707 and that the selected values are output to the adder 705.

More specifically, the control unit 86 allows the selector 704 to select −1022*P and allows the selector 706 to select 1 when the MSB of the register S 707 is 0. That is, when the accumulated value stored in the register S 707 is positive (MSB=0), the adder 705 receives the value −1022*P from the register E 703 via the invertor 708 and selector 704, and receives 1 via the selector 706. With this arrangement, in the next addition performed by the adder 705, the value 1022*P is subtracted, preventing the occurrence of an overflow in the adder 705 and the register S 707.

The control unit 86 allows both selectors 704 and 706 to select 0 when the accumulated value stored in the register S 707 is negative (MSB=1).

The control unit 86 judges whether the accumulated value stored in the register S 707 is positive or negative by referring to the MSB after the loop has been repeated as specified (i=1, 2, . . . 20) and the accumulated value is updated the last time. When the value is negative (MSB=1), the control unit 86 allows the selector 704 to select 1022*P and allows the selector 706 to select 0, allowing the adder 705 to add 1022*P to the accumulated value stored in the register S 707 as a correction. Thus, the control unit 86 performs a correction so that the accumulated value is finally positive. Also, when the last accumulated value is positive (MSB=0), the control unit 86 allows both selectors 704 and 706 to select 0 so that no correction is made to the last accumulated value.

Figure 16:
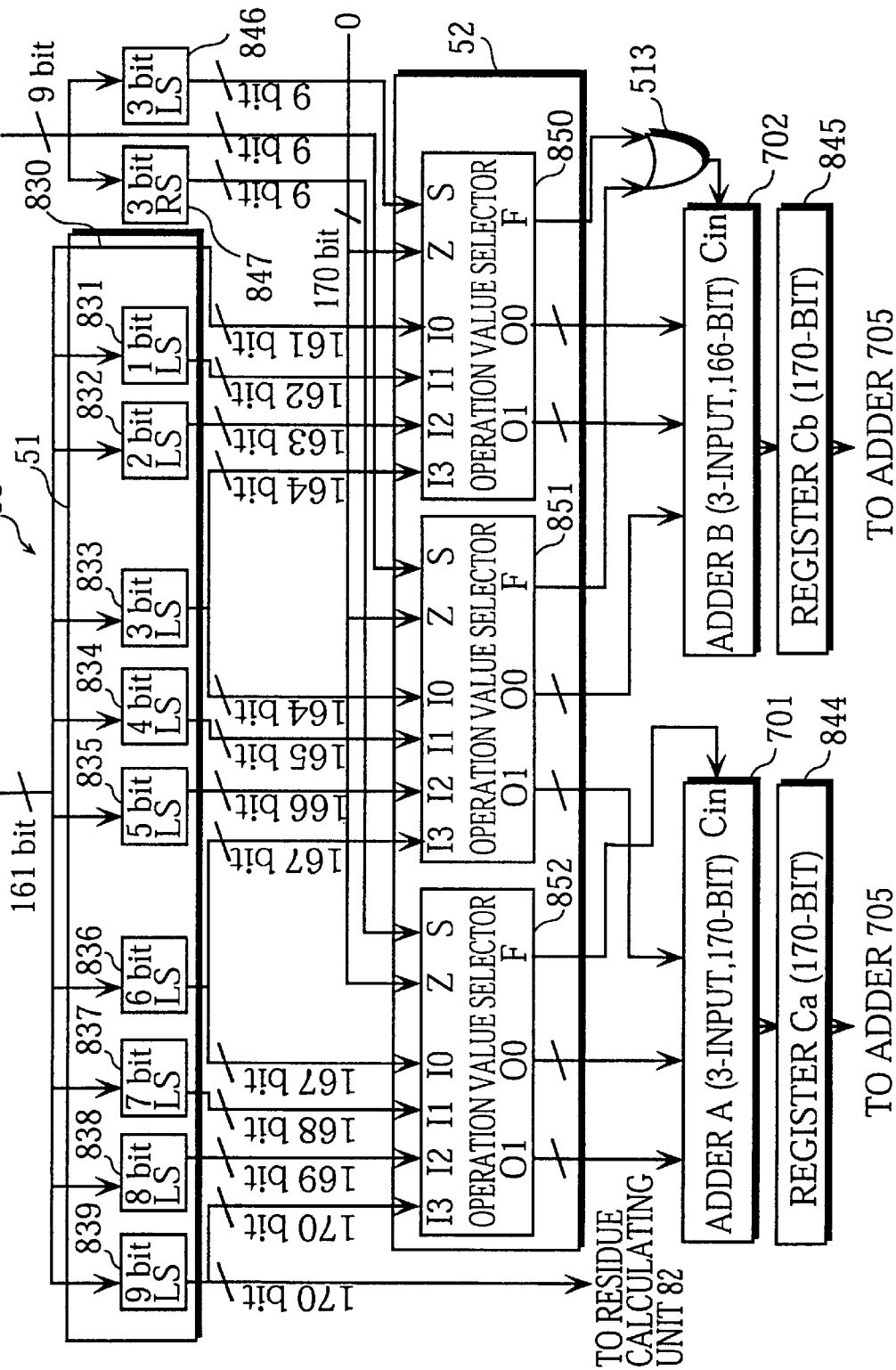
FIG. 16 shows another construction of the partial product calculating unit 83.

The partial product calculating unit 83 may have the construction shown in FIG. 16.

FIG. 16 differs from FIG. 12 in that it includes shifters 847 and 846, and that it includes operation value selectors 850, 851, and 852 instead of the operation value selectors 840, 841, and 842.

The shifter 847 performs a shift right of three bits on the partial multiplier b(i).

The shifter 846 performs a shift left of three bits on the partial multiplier b(i).

FIG. 17 shows the input/output logic which is common to the operation value selectors 850, 851, and 852. As understood from this drawing, the partial product calculating unit 83, being provided with the shifters 847 and 846, allows the selection unit 52 to receive the partial multiplier b(i) shifted right by three bits, the partial multiplier b(i) itself, and the partial multiplier b(i) shifted left by three bits. With this arrangement, it is possible for the operation value selectors 850, 851, and 852 to sue the same input/output logic. This also enables one control circuit to be used for these selectors.

Transformation from Formula 1 to Formula 2

The following is a detailed description of the transformation from Formula 1 to Formula 2.

$$A * B \bmod P \qquad (Z)$$

$$= A * \sum_{i=1}^{k/s} \{b[s*i-1:s*i-s] * 2^{s*(i-1)}\} \bmod P$$

$$\equiv \sum_{i=1}^{k/s} \{A * 2^{s*i-s} \bmod P * b[s*i-1:s*i-s]\}$$

(Sign "≡" indicates congruent values of the modulo p multiplication)
Here, $A*2^{2*1-s}$ mod P can transform as follows:

$$A * 2^{s*i-s} \bmod P = A \bmod P = A \quad (i = 1)$$

$$\begin{cases} A * 2^s \bmod P & (i = 2) \\ A * 2^{2*s} \bmod P \equiv A * 2^s \bmod P * 2^s \bmod P & (i = 3) \\ A * 2^{3*s} \bmod P \equiv A * 2^s \bmod P * 2^s \bmod P * 2^s \bmod P & (i = 4). \end{cases}$$

The above transformation is represented by the following recurrence formula:

$$\begin{cases} C(i) = A & (i = 1) \\ C(i) \equiv C(i-1) * 2^s \bmod P & (2 \leq i \leq k/s). \end{cases}$$

$$\text{Hence, } (Z) = A * \sum_{i=0}^{k/s} Ci * b[s*i - 1 : s*i - s]$$

The present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A modular multiplication apparatus for calculating a congruent value of a modulo P multiplication of a product of a multiplicand a and a $k_b$-bit multiplier b, wherein P is k-bit, the congruent value being obtained from a following formula:

$$\text{accumulated value} = \sum_{i=0}^{[[kb/s]]} C(i) * b[s*i + s - 1 : s*i],$$

where [[kb/s]] represents integers included in quotient $k_b/s$, i represents integers in a range of 0 to [[kb/s]],
C(i) is represented by a recurrence formula, and
C(i)=a (i=0)
C(i)=(C(i-1)*$2^s$) mod P (i≧1)
C(i) (intermediate value) is a congruent value of a modulo P multiplication of a product (a preceding intermediate value*$2^s$), wherein the congruent value is calculated recurrently, an initial intermediate value is the multiplicand a, and the product being equal to the preceding intermediate value shifted s bits,
b[s*i+s−1:s*i] represents s-bit partial multipliers included in the multiplier b at places from $2^{s*i+s-1}$ to $2^{s*i}$, the modular multiplication apparatus comprising:
a table means which prestores residues of modulo p multiplications of (m-bit value)*$2^k$, wherein m is an integer s or larger;
an intermediate value calculation means for outputting the multiplicand a as an intermediate value C(0) first time (i=0) and second time and after (i≧1), performing a shift of s bits on a preceding intermediate value C(i−1) to acquire a shifted intermediate value, referring to the table means to read out a residue corresponding to in bits adjacent to lower k bits of the shifted intermediate value, and obtaining another intermediate value C(i) by adding up the read-out residue and the lower k bits; and
an accumulation means for obtaining the accumulated value by detecting, in order from lower bits, partial multipliers b[s*i+s−1:s*i] which are s-bit parts making up the multiplier b, calculating a partial product C(i)*b[s*i+s−1:s*i] for each of the first time (i=0) through the last time (i=[[kb/s]], and accumulating the calculated partial products.

2. The modular multiplication apparatus of claim 1, wherein
the intermediate value calculation means includes:
a first hold means for holding an intermediate value;
a shift means -for obtaining the shifted intermediate value by performing a shift of s bits on the intermediate value held by the first hold means in correspondence to the partial multiplier b[s*i+s−1:s*i];
a division means for dividing the shifted intermediate value into a higher data and a lower data, wherein the higher data is composed of m bits adjacent to lower k bits of the shifted intermediate value, and the lower data is composed of the lower k bits;
a read means for referring to the table means to read out a residue corresponding to the higher data; and
an addition means for calculating another intermediate value by adding up the read-out residue and the lower data, wherein
the first hold means updates the intermediate value to the other intermediate value calculated by the addition means each time the addition means calculates a new intermediate value, and outputs the multiplicand as an intermediate value first time, and outputs the updated intermediate Value second time and after.

3. The modular multiplication apparatus of claim 2, wherein
the table means includes:
a memory device which prestores residues of modulo p multiplications of (m-bit value)*$2^k$, wherein storage areas of residues respectively correspond to addresses to be input, and the addresses further correspond to m-bit values.

4. The modular multiplication apparatus of claim 2, wherein
the m-bit value is divided into an m1-bit value and an m2-bit value, where the m1-bit value is composed of lower m1 bits and the m2-bit value is composed of higher m2 bits, wherein m=m1+m2,
each m-bit value corresponds to a combination of an m1-bit value and an m2-bit value,
the table means includes:
a first Part table means which prestores residues of modulo p multiplications of (m1-bit value)*$2^k$; and
a second part table means which prestores residues of modulo p multiplications of (m2-bit value)*$2^{k+m1}$, wherein
the addition means adds up residues respectively read out from the first part table means, and the second part table means and the lower data.

5. The modular multiplication apparatus of claim 2, wherein the m bits are divided into t bit-sequences respectively having m1 bits, m2 bits, . . . mt bits in order from lower bits, wherein $3 \leq t \leq m$, the m bits are divided into t bit-sequences which respectively have m1 bits, m2 bits, . . mt bits, wherein $3 \leq t \leq m$, each m-bit value corresponds to a combination of values respectively represented by t bit-sequences mi, wherein i represents each integer in a range of 1 to t, the table means includes:

t partial table means Ti which each prestore residues of modulo p multiplications of (mi-bit value)*$2^{k+x}$, wherein $x=m1+m2+\ldots+m(i-1)$, and the addition means adds up t residues respectively read out by the read means from the t partial table means Ti and the lower data.

6. The modular multiplication apparatus of claim 2, wherein the m bits are divided into t bit-sequences respectively having m1 bits, m2 bits, . . . mt bits in order from, lower bits, wherein $2 \leq t \leq m$, the table means includes:

t partial table means Ti which each prestore residues of modulo p multiplications of (a value represented by bit-sequences mi)*$2^{k+x}$, wherein $$x = \sum_{j=1}^{i-1} mj,$$

the addition means adds up t residues respectively read out by the read means from the t partial table means Ti and the lower data, wherein a result of this addition is equivalent to the other intermediate value.

7. The modular multiplication apparatus of claim 6, wherein each of the t partial table means Ti prestores each of the residues as k-bit data.

8. The modular multiplication apparatus of claim 7 further comprising: an accumulation means; and a correction means, wherein the accumulation means includes:

a third register for holding 0 as an initial value; and an adder for adding up the partial products C(i)*b[s*i+s−1:s*i] and the accumulated value stored in the third register and storing a result of this addition into the third register as another accumulated value, wherein the correction means includes:

a correction value hold means for holding a correction value being an integral multiple of P; and a correction control means for allowing the adder to subtract the correction value held by the correction value hold means from the accumulated value held by the third register when the accumulated value is larger than a predetermined value.

9. The modular multiplication apparatus of claim 8, wherein the third register includes a sign bit, the correction control means allows the adder to subtract the correct ion value from the accumulated value at the same time when the adder adds up the partial product and the accumulated value stored in the third register when the accumulated value is positive, and the correction value is an integral multiple of 1 and the absolute value of the correction value is equivalent to or smaller than a maximum value $(t+1)(2^s-1)$ P of the partial product.

10. The modular multiplication apparatus of claim 6, wherein the modulo P multiplication satisfies $P=2^k-\alpha$, each of the t partial table means Ti prestores each of the residues as k3-bit data, wherein k3 is equivalent to the number of bits in $t*2^m*\alpha$, and $\alpha$ is a constant defined to satisfy a condition that k3 is smaller than k.

11. The modular multiplication apparatus of claim 10, wherein each of the t partial table means Ti includes $2^{mi}$ entries which respectively correspond to values in a range of 0 to ($2^{mi}-1$) each having mi bits, wherein the $j^{th}$ entry stores $(j-1)*2^{m1+\cdots+m(i-1)}*\alpha$, wherein $j=1, \ldots 2^{mi}$.

12. The modular Multiplication apparatus of claim 11 further comprising: an accumulation means; and a correction means, wherein the accumulation means includes:

a third register for holding 0 as an initial value; and an adder for adding up the partial products C(i)*b[s*i+s−1:s*i] and the accumulated value stored in the third register and storing a result of this addition into the third register as another accumulated value, wherein the correction means includes:

a correction value hold means for holding a correction value being an integral multiple of P; and, a correction control means for allowing the adder to subtract the correction value held by the correction value hold means from the accumulated value held by the third register when the accumulated value is larger than a predetermined value.

13. The modular multiplication apparatus of claim 12, wherein the third register includes a sign bit, the correction control means allows the adder to subtract the correction value from the accumulated value at the same time when the adder adds up the partial product and the accumulated value stored in the third register when the accumulated value is positive, and the correction value is an integral multiple of P and the absolute value of the correction value is equivalent to or smaller than a maximum value ($2^{s+1}*t-2$) P of the partial product.

14. The modular multiplication apparatus of claim 2 further comprising:

a post-processing means for using the table means to obtain a residue of a modulo P multiplication of a last accumulated value having been corrected by the correction means, wherein the last accumulated value is an accumulated value corrected by the correction means in correspondence to a partial multiplier including the most significant bit of the multiplier.

15. The modular multiplication apparatus of claim 14, wherein the table means includes:

a memory device which prestores residues of modulo p multiplications of (m-bit value)*$2^k$, wherein storage areas of residues respectively correspond to addresses to be input, and the addresses further correspond to m-bit values.

16. The modular multiplication apparatus of claim 14, wherein the m bits are divided into lower m1 bits and higher m2 bits, wherein m=m1+m2, each m-bit values corresponds to a combination of an m1-bit value and an m2-bit value, the table means includes:
   a first part table means which prestores residues of modulo p multiplications of (m1-bit value)*$2^{k+m1}$, and
   a second part table means which prestores residues of modulo p multiplications of (m2-bit value)*$2^{k+m1}$, wherein the addition means adds up residues respectively read out from the first part table means and the second part table means and the lower data.

17. The modular multiplication apparatus of claim 14, wherein the m bits are divided into t bit-sequences respectively having m1 bits, m2 bits, . . . mt bits in order from lower bits, wherein 3≦t≦m, each m-bit value corresponds to a combination of values respectively represented by t bit-sequences mi, wherein i represents integers in a range of 1 to t, the table means includes:
   t partial table means Ti which each prestore residues of modulo p multiplications of (a value represented by bit-sequences mi)*$2^{k+x}$, wherein x=m1+m2+ . . . +m(i−1), and the addition means adds up t residues respectively read out by the read means from the t partial table means Ti and the lower data.

18. The modular multiplication apparatus of claim 14, wherein the m bits are divided into t bit-sequences respectively having m1 bits, m2 bits, . . . mt bits in order from lower bits, wherein 2≦t≦m, the table means includes:
   t partial table means Ti which each prestore residues of modulo p multiplications of (a value represented by bit-sequences mi)*$2^{k+x}$, wherein $$x = \sum_{j=1}^{i-1} mj,$$

the addition means adds up t residues respectively read out by the read means from the t partial table means Ti and the lower data, wherein a result of this addition is equivalent to the other intermediate value.

19. The modular multiplication apparatus of claim 18, wherein each of the t partial table means Ti prestores each of the residues as k-bit data.

20. The modular multiplication apparatus of claim 19 further comprising: an accumulation means; and a correction means, wherein the accumulation means includes:
   a third register for holding 0 as an initial value; and
   an adder for adding up the partial products C(i)*b[s*i+s−1:s*i] and the accumulated value stored in the third register and storing a result of this addition into the third register as another accumulated value, wherein the correction means includes:
   a correction value hold means for holding a correction value being an integral multiple of P; and
   a correction control means for allowing the adder to subtract the correction value held by the correction value hold means from the accumulated value held by the third register when the accumulated value is larger than a predetermined value.

21. The modular, multiplication apparatus of claim 20, wherein the third register includes a sign bit, the correction control means allows the adder to subtract the correction value from the accumulated value at the same time when the adder adds up the partial product and the accumulated value stored in the third register when the accumulated value is positive, and the correction value is an integral multiple of P and the absolute value of the correction value is equivalent to or smaller than a maximum value (t+1)($2^{s-1}$) P of the partial product.

22. The modular multiplication apparatus of claim 18, wherein the modulo P multiplication satisfies P=$2^k$−α, each of the t partial table means Ti prestores each of the residues as k3-bit data, wherein k3 is equivalent to the number of bits in t*$2^m$*α, and α is a constant defined to satisfy a condition that k3 is smaller than k.

23. The modular multiplication apparatus of claim 22, wherein each of the t partial table means Ti includes $2^{mi}$ entries which respectively correspond to values in a range of 0 to ($2^{mi}-1$) each having mi bits, wherein the $j^{th}$ entry stores (j−1)*$2^{m1+ \cdots +m(i-1)}$*α, wherein j=1, . . . $2^{mi}$.

24. The modular multiplication apparatus of claim 23 further comprising an accumulation means; and a correction means, wherein the accumulation means includes;
   a third register for holding 0 as an initial value; and
   an adder, for adding up the partial products C(i)*b[s*i+s−1:s*i] and the accumulated value stored in the third register and storing a result of this addition into the third register as another accumulated value, wherein the correction means includes:
   a correction value hold means for holding a correction value being an integral multiple of P; and
   a correction control means for allowing the adder to subtract the correction value held by the correction value hold means from the accumulated value held by the third register when the accumulated value is larger than a predetermined value.

25. The modular multiplication apparatus of claim 24, wherein the third register includes a sign bit, the correction control means allows the adder to subtract the correction value from the accumulated value at the same time when the adder adds up the partial product and the accumulated value stored in the third register when the accumulated value is positive, and the correction value is an integral multiple of P and the absolute value of the correction value is equivalent to or smaller than a maximum value (t+1)($2^{s-1}$) P of the partial product.

26. A modular multiplication apparatus for calculating a congruent value of a modulo p multiplication of a product of a multiplicand and a multiplier, wherein P is k-bit data, the modular multiplication apparatus comprising;

an output means for outputting, in order from lower bits, partial multipliers which are s-bit parts making up the multiplier, wherein s is an integer 2 or larger;

a first calculation means for obtaining shifted multiplicands by shifting the multiplicand in accordance with a place of each partial multiplier, and for calculating congruent values of a modulo p multiplication of respective shifted multiplicands, wherein the congruent values obtained here are referred to as intermediate values;

a second calculation means for calculating partial products by multiplying the partial multipliers output from the output means by the corresponding intermediate values output from the first calculation means;

an accumulation means for accumulating the partial products output from the second calculation means and outputting an accumulated value;

a correction means for performing a correction so that the accumulated value does not exceed a predetermined number of bits by adding/subtracting an integral multiple of p to/from the accumulated value; and a control means for allowing the first calculation means, the second calculation means the accumulation means, and the collection means to repeatedly perform the respective operations for each of the partial multipliers output from the output means, wherein the first calculation means includes:
  a table means which prestores residues of modulo p multiplications of (m-bit value)*$2^k$, wherein m is an integer s or larger, wherein the first calculation means outputs the multiplicand as an intermediate value first time, and second time and after, obtains a shifted intermediate value by performing a shift of s bits on a preceding intermediate value, refers to the table means to read out a residue corresponding to m bits adjacent to lower k bits of the shifted intermediate value, and calculates another intermediate value by adding up the read-out residue and the lower k bits.

27. The modular multiplication apparatus of claim 26, wherein the first calculation means includes:
  a first hold means for holding an intermediate value;
  a shift means for obtaining the shifted intermediate value by performing a shift of s bits on the intermediate value held by the first hold means in correspondence to each partial multiplier output from the output means second time and after;
  a division means for dividing the shifted intermediate value into a higher data and a lower data, wherein the higher data is composed of m bits adjacent to lower k bits of the shifted intermediate value, and the lower data is composed of the lower k bits;
  a read means for referring to the table means to read out a residue corresponding to the higher data; and
  an addition means for calculating another intermediate value by adding up the read-out residue and the lower data, wherein the first hold means updates the intermediate value to the other intermediate value calculated by the addition means, and outputs the multiplicand as an intermediate value first time, and outputs the updated intermediate value second time and after, and the second calculation means calculates partial products by using the intermediate value held by the first hold means.

28. The modular multiplication apparatus of claim 27, wherein the table means includes:
  a memory device which prestores residues of modulo p multiplications of (m-bit value)*$2^k$, wherein storage areas of residues respectively correspond to addresses to be input, and the addresses further correspond to m-bit values.

29. The modular multiplication apparatus of claim 27, wherein the m bits are divided into lower m1 bits and higher m2 bits, wherein m=m1+m2, each m-bit value corresponds to a combination of an m1-bit value and an m2-bit value, the table means includes:
  a first part table means which prestores residues of modulo p multiplications of (m1-bit value)*$2^k$; and
  a second part table means which prestores residues of modulo p multiplications of (m2-bit value)*$2^{k+m1}$, wherein the addition means adds up residues respectively read out from the first part table means and the second part table means and the lower data.

30. The modular multiplication apparatus of claim 27, wherein the m bits are divided into t bit-sequences respectively having m1 bits, m2 bits, mt bits in order from lower bits, wherein $3 \leq t \leq m$, each m-bit value corresponds to a combination of values respectively represented by t bit-sequences mi, wherein i represents integers in a range of 1 to t, the table means includes:
  t partial table means Ti which each prestore residues of modulo p multiplications of (a value represented by bit-sequences mi)*$2^{k+x}$, wherein x=m1+m2+ . . . +m(i−1), and the addition means adds up t residues respectively read out by the read mean from the t partial table means Ti and the lower data.

31. The modular multiplication, apparatus of claim 27, wherein the control means controls a pipeline process which includes a first stage, a second stage, and a third stage, and in the first stage, the control means allows the output means to output a partial multiplier and allows the first calculation means to output an intermediate value, in the second stage, the control means allows the second calculation means to output a partial product, and in the third stage, the control means allows the accumulation means to accumulate partial products and allows the correction on means to perform correction.

32. The modular multiplication apparatus of claim 31, wherein the output means includes:
  a multiplier hold means for holding the multiplier as an initial value and outputting a partial multiplier which is composed of lower s bits of a value currently held in the multiplier hold means;
  a shift right means for performing a shift right of s bits on a value held by the multiplier hold means and outputting the right-shifted value to the multiplier hold means so that the right-shifted value is stored in the multiplier hold means.

33. The modular multiplication apparatus of claim 32, wherein the second calculation means includes:
a multiplication means for calculating the partial product of the intermediate value held by the first hold means and the partial multiplier output from the multiplier hold means; and
a second hold means for holding the partial product calculated by the multiplication means.

34. The modular multiplication apparatus of claim 33, wherein
the accumulation means includes:
a third hold means for holding the accumulated value; and
an adder for adding up the partial product held by the second hold means and the accumulated value held by the third hold means and outputting a result value, wherein
the third hold means holds the result value output from the adder as the accumulated value.

35. The modular multiplication apparatus of claim 34, wherein
the correction means includes:
a correction value hold means for holding a correction value being the integral multiple of P; and
a correction control means for when the number of effective bits of the accumulated value stored in the third hold means exceeds a predetermined value, allowing the adder to subtract the correction value held by the correction value hold means from the accumulated value at the same time the adder adds up the partial product and the accumulated value.

36. The modular multiplication apparatus of claim 35, wherein
the control means controls the pipeline process using the first hold means and the multiplier hold means as pipeline latches between the first stage and the second stage, and using the second hold means as a pipeline latch between the second stage and the third stage.

37. The modular multiplication apparatus of claim 31, wherein
the table means includes:
a memory device which prestores residues of modulo p multiplications of (m-bit value)*$2^k$, wherein storage areas of residues respectively correspond to addresses to be input, and the addresses further correspond to m-bit values.

38. The modular multiplication apparatus of claim 31, wherein
the m bits are divided into lower m1 bits and higher m2 bits, wherein m=m1+m2,
each m-bit value corresponds to a combination of an m1-bit value and an m2-bit value,
the table means includes:
a first part table means which prestores residues of modulo p multiplications of (m1-bit value)*$2^k$; and
a second part table means which prestores residues of modulo p multiplications of (m2-bit value)*$2^{k+m1}$, wherein
the addition means adds up residues respectively read out from the first part table means and the second part table means and the lower data.

39. The modular multiplication apparatus of claim 31, wherein
the m bits are divided into t bit-sequences respectively having m1 bits, m2 bits, . . . mt bits in order from lower bits, wherein 3≦t≦m, each m-bit value corresponds to a combination of values respectively represented by t bit-sequences mi, wherein i represents integers in a range of 1 to t,
the table means includes:
t partial table means Ti which each prestore residues of modulo p multiplications of (a value represented by bit-sequences mi)*$2^{k+x}$, wherein x=m1+m2+ . . . +m(i-1), and
the addition means adds up t residues respectively read out by the read means from the t partial table means Ti and the lower data.

40. The modular multiplication apparatus of claim 27, wherein
the second calculation mean includes:
a judgment means for judging whether all bits of the s-bit partial multiplier output from the output means are 1;
a first generation means for generating a product of a multiplication of the intermediate value and $2^s$; and generating a negative value of the multiplicand;
a second generation means for generating a product of a multiplication of the, intermediate value and a bit weight of each bit of the partial multiplier, wherein the product is equivalent to the intermediate value shifted by the number of bits corresponding to each bit weight; and
a second addition means for: adding up each value generated by, the first generation means when the judgment means judges that the all bits are 1; and adding up products corresponding to bits being binary value "1" in the partial multiplier out of the products generated by the second generation means when the judgment means does not judge that the all bits are 1.

41. The modular multiplication apparatus of claim 40, wherein
the second generation means includes:
$i^{th}$ shift means for obtaining a shifted intermediate value by, performing a shift of i bits on the intermediate value calculated by the first calculation means, wherein i represents integers in a range of 1 to (s-1),
the first generation means includes:
$s^{th}$ shift means for obtaining a shifted intermediate value by performing a shift of s bits on the intermediate value calculated by the first calculation means;
a complement generation means for generating a one's complement of the intermediate value; and
a constant output means for outputting a constant 1, wherein
the second addition means includes:
a selection means for: selecting the shifted intermediate value output from the $s^{th}$ shift means, the one's complement generated by the complement generation means, and the constant 1 when the judgment means' judges that the all bits are 1; and selecting the intermediate value when a bit at a place of $2^0$ of the partial multiplier has binary value "1" when the judgment means does not judge that the all bits are 1; and selecting the shifted intermediate value output from the $i^{th}$ shift means when a bit at a place of $2^i$ of the partial multiplier has binary value "1" when the judgment means does not judge that the all bits are 1; and an adder for calculating the partial product by adding up values selected by the selection means.

42. The modular multiplication apparatus of claim 27, wherein s=3n, the partial multiplier is divided into n 3-bit data sequences s1, . . . sn in order from lower bits, the second calculation means includes:

$j^{th}$ judgment means for judging whether the 3-bit data sequence sj is $(111)_2$, wherein j represents integers in a range of 1 to n, $j^{th}$ special generation means for generating a product of $I*(1000)_2*2^{3(j-1)}$ (I representing the intermediate value) and generating N (N representing a negative value of $I*2^{3(j-1)}$ when the $j^{th}$ judgment means judges that the 3-bit data sequence sj is $(111)_2$, wherein $2^{3(j-1)}$ corresponds to a place of the 3-bit data sequence sj;

$j^{th}$ general generation means for generating, for each bit of the 3-bit data sequence sj, products of multiplications of a logical value of a current bit, each bit weight of each bit in the s-bit partial multiplier, and the intermediate value when the $j^{th}$ judgment means does not judge that the 3-bit data sequence sj is $(111)_2$, wherein the product is equivalent to the intermediate value shifted by the number of bits corresponding to the bit weight; and a second addition means for adding up the products generated by the $j^{th}$ special generation means and the $j^{th}$ general generation means.

43. The modular multiplication apparatus of claim 42, wherein the second calculation means includes:

$i^{th}$ shift means for obtaining a shifted intermediate valve by performing a shift of i bits on the intermediate value, wherein i represents integers in a range of 1 to s, wherein the $j^{th}$ general generation means when j=1 uses shifted intermediate values obtained by the $i^{th}$ shift means when i=1, 2, the $j^{th}$ general generation means when j≠1 uses shifted intermediate values obtained by the $(3j-3)^{th}$ shift means, the $(3j-2)^{th}$ shift means, and the $(3j-1)^{th}$ shift means, the $j^{th}$ special generation means uses shifted intermediate values obtained by the $3j^{th}$ shift means, and the $j^{th}$ special generation means and the (j+1) general generation means share the $3j^{th}$ shift means.

44. The modular multiplication apparatus of claim 43, wherein the $j^{th}$ special generation means includes:

a complement generation means for generating one's complement of either of the intermediate value and the shifted intermediate value obtained by the $(3j-3)^{th}$ shift means; and a constant output means for outputting the constant 1, the second addition means includes:

a selection means for: selecting the shifted intermediate value output from the $3j^{th}$ shift means, the one's complement generated by the complement generation means of the $j^{th}$ special generation means, and the constant 1 output from the constant output means of the $j^{th}$ special generation means when the $j^{th}$ judgment means judges that the 3-bit data sequence sj is $(111)_2$; selecting the intermediate value and outputs from the $(3j-2)^{th}$ shift means and the $(3j-1)^{th}$ shift means when the $j^{th}$ judgment means does not judge that the 3-bit data sequence s1, is $(111)_2$; and selecting outputs from the $(3j-3)^{th}$ shift means, the $(3j-2)^{th}$ shift means, and the $(3j-1)^{th}$ shift means when the $j^{th}$ judgment means does not judge that the 3-bit data sequence sj except for the 3-bit data sequence s1 is $(111)_2$; and an adder for calculating the partial product by adding up values selected by the selection means.

45. The modular multiplication apparatus of claim 27 further comprising:

a post-processing means for using the division means, the read means, and the addition means to obtain a residue of a modulo p multiplication of a last accumulated value having been corrected by the correction means, wherein the last accumulated value is an accumulated value corrected by the correction means in correspondence to the partial multiplier output last from the output means.

46. A modular multiplication apparatus for calculating a k1-bit congruent value of a modulo p multiplication of a product of a k-bit multiplicand a and a k-bit multiplier b, wherein P is k-bit and k1≦k, the modular multiplication apparatus comprising;

an output means for outputting, in order from lower bits, partial multipliers which are s-bit parts making up the multiplier, wherein s is an integer 2 or larger;

a first calculation means, including a k2-bit first register which stores the multiplicand a as initial data, wherein k2≧k, for calculating a congruent value of a modulo p multiplication of a value being data in the first register shifted and storing the obtained congruent value in the first register, wherein the congruent value obtained here is referred to as intermediate value;

a second calculation means, including a second register which stores 0 as initial data, for calculating partial products by multiplying the partial multipliers output from the output means by the data stored in the first register and storing the calculated partial products in the second register;

an accumulation means, including a third register which stores 0 as initial data, for accumulating the partial products output from the second calculation means and adding an accumulated value to data in the third register;

a correction means for correcting the accumulated value by adding/subtracting an integral multiple of p to/from the accumulated value so that a congruent Value of a modulo P multiplication whose absolute value is smaller than an absolute value of the accumulated value is obtained; and a control means for allowing the first calculator means, the second calculation means, the accumulation means, and the correction means to repeatedly perform the respective operations for each of the partial multipliers output from the output means, wherein the first calculation means includes:

a table means which prestores residues of modulo p multiplications of m-bit value, wherein m=s+k2-k, wherein the first calculation means outputs the multiplicand as an intermediate value first time, and second time and after, obtains a shifted intermediate value by performing a shift of s bits on a preceding intermediate value, refers to the table means to read out a residue corresponding to m bits adjacent to lower k bits of the shifted intermediate value, and calculates another intermediate value by adding up the read-out residue and the lower k bits.

47. The modular multiplication apparatus of claim 46, wherein
the first calculation means includes:
a shift means for obtaining the shifted intermediate value by performing a shift of s bits on a preceding k2-bit intermediate value output from the first register in correspondence to each partial multiplier output from the output means second time and after;
a division means for dividing the shifted intermediate value into a higher data and a lower data, wherein the higher data is composed of m bits adjacent to lower k bits of the shifted intermediate value, and the lower data is composed of the lower k bits;
a read means for referring to the table means to read out a residue corresponding to the higher data; and
an addition means for calculating another intermediate value by adding up the read-out residue and the lower data, wherein
the first register updates the intermediate value to the other intermediate value calculated by the addition means.

48. The modular multiplication apparatus of claim 47 wherein
the m bits are divided into t bit-sequences respectively having m1 bits, m2 bits, . . . mt bits in order from lower bits, wherein $2 \leq t \leq m$,
the table means includes:
t partial table means Ti which each prestore residues of modulo p multiplications of (a value represented by bit-sequences mi)*$2^{k+x}$, wherein $$x = \sum_{j=1}^{i-1} mj,$$

the addition means adds up t residues respectively read out by the read means from the t partial table means Ti and the lower data, wherein a result of this addition is equivalent to the other intermediate value.

49. The modular multiplication apparatus of claim 48, wherein
each of the t partial table means Ti prestores each of the residues as k-bit data.

50. The modular, multiplication apparatus of claim 49, wherein
the accumulation means includes:
an adder for adding up the partial products calculated by the second calculation means and the accumulated value stared in the third register and storing a result of this addition into the third register as another accumulated value, wherein
the correction means includes:
a correction value hold means for holding a correction value being an integral multiple of P; and
a correction control means for allowing the adder to subtract the correction value held by the correction value hold means from the accumulated value held by the third register when the accumulated value is larger than a predetermined value.

51. The modular multiplication apparatus of claim 50, wherein the third register includes a sign bit,
the correction control means allows the adder to subtract the correction value at the same time the adder adds up the partial product and the accumulated value when the accumulated value stored in the third register is positive, and
the correction value is an integral multiple of P and the absolute value of the correction value is equivalent to or smaller than a maximum value $(t+1)(2^s-1) P$ of the partial product.

52. The modular multiplication apparatus of claim 48, wherein
the modulo P multiplication satisfies $P=2^k-\alpha$,
each of the t partial table means Ti prestores each of the residues as k3-bit data, wherein k3 is equivalent to the number of bits in $t*2^m*\alpha$, and $\alpha$ is a constant defined to satisfy a condition that k3 is smaller than k.

53. The modular multiplication apparatus of claim 52, wherein
each of the partial table means Ti includes $2^{mi}$ entries which respectively correspond to values in a range of 0 to $(2^{mi}-1)$ each having mi bits, wherein
the $j^{th}$ entry stores $(j-1)*2^{m1+ \cdots +m(i-1)}*\alpha$, wherein $j=1, \ldots 2^{mi}$.

54. The modular multiplication apparatus of claim 53, wherein
the accumulation means includes:
an adder for adding up the partial products calculated by the second calculation means and the accumulated value stored in the third register and storing a result of this addition into the third register as another accumulated value, wherein
the correction means includes:
a correction value - hold means for holding a correction value being an integral multiple of P; and
a correction control means for allowing the adder to subtract the correction value held by the correction value hold means from the accumulated value held by the third register when the accumulated value is larger than a predetermined value.

55. The modular multiplication apparatus of claim 54, wherein
the third register includes a sigh bit,
the correction, control means allows the adder to subtract the correction value at the same time the adder adds up the partial product and the accumulated value when the accumulated value stored in the third register is positive, and
the correction value is an integral multiple of P and the absolute value of the correction value is equivalent to or smaller than a maximum value $(t+1)(2^G-1) P$ of the partial product.

56. The modular multiplication apparatus, of claim 48, wherein
the control means controls a pipeline process which includes a first stage, a second stage, and a third stage, and in the first stage, the control means allows the output means to output a partial multiplier and allows the first calculation means to output an intermediate value, in the second stage, the control means allows the second calculation means to output a partial product, and in the third stage, the control means allows the accumulation means to accumulate partial products and allows the correction means to perform correction.

57. The modular multiplication apparatus of claim 56, wherein the output means includes:
   a multiplier hold means for holding the multiplier as an initial value and outputting a partial multiplier which is composed of lower s bits of a value currently held in the multiplier hold means;
   a shift right means for performing a shift right of s bits on a value hold by the multiplier hold means and outputting the right-shifted value to the multiplier hold means so that the right-shifted value is stored in the multiplier hold means.

58. The modular multiplication apparatus of claim 57, wherein
   the second calculation means includes:
      a multiplication means for calculating the partial product of the intermediate value held by the first hold means and the partial multiplier output from the multiplier hold means; and
      a second hold means for holding the partial product calculated by the multiplication means.

59. The modular multiplication apparatus of claim 58, wherein
   the accumulation means includes:
      a third hold means for holding the accumulated value; and
      an adder for adding up the partial product held by the second hold means and the accumulated value held by the third hold means and outputting a result value, wherein
   the third hold means holds the result value output from the adder as the accumulated value.

60. The modular multiplication apparatus of claim 59, wherein
   the correction means includes:
      a correction value hold means for holding a correction value being the integral multiple of P; and
      a correction control means for, when the number of effective bits of the accumulated value stored in the third hold means exceeds a predetermined value, allowing the adder to subtract the correction value held by the correction value hold means from the accumulated value at the same time the adder adds up the partial product and the accumulated value.

61. The modular multiplication apparatus of claim 60, wherein
   the control means controls the pipeline process using the first hold means and the multiplier hold means as pipeline latches between the first stage and the second stage, and using the second hold means as a pipeline latch between the second stage and the third stage.

62. The modular multiplication apparatus of claim 56, wherein
   each of the t partial table means Ti prestores each of the residues as k-bit data.

63. The modular multiplication apparatus of claim 62, wherein
   the accumulation means includes:
      an adder for adding up the partial products calculated by the second calculation means and the accumulated value stored in the third register and, storing a result of this addition into the third register as another accumulated value, wherein
   the correction means includes:
      a correction value hold means for holding a correction value being an integral multiple of P; and
      a correction control means for allowing the adder to subtract the correction value held by the correction value hold means from the accumulated value held by the third register when the accumulated value is larger than a predetermined value.

64. The modular multiplication apparatus of claim 63, wherein
   the third register includes a sign bit,
   the correction control means allows the adder to subtract the correction value at the same time the adder adds up the partial product and the accumulated value when the accumulated value stored in the third register is positive, and
   the correction value is an integral multiple of P and the absolute value of the correction value is equivalent to or smaller than a maximum value $(t+1)(2^s-1) P$ of the partial product.

65. The modular multiplication apparatus of claim 56, wherein
   the modulo P multiplication satisfies $P=2^k-\alpha$,
   each of the t partial table means Ti prestores each of the residues as k3-bit data, wherein k3 is equivalent to the number of bits in $t*2^m*\alpha$, and $\alpha$ is a constant defined to satisfy a condition that k3 is smaller than k.

66. The modular multiplication apparatus of claim 65, wherein
   each of the t partial table means Ti includes $2^{mi}$ entries which respectively correspond to values in a range of 0 to $(2^{mi}-1)$ each having mi bits, wherein
   the $j^{th}$ entry stores $(j-1)*2^{m1+ \cdots +m(i-1)}*\alpha$, wherein j=1, ... $2^{mi}$.

67. The modular multiplication apparatus of claim 66, wherein
   the accumulation means includes:
      an adder for adding up the partial products calculated by the second calculation means and the accumulated value stored in the third register and storing a result of this addition into the third register as another accumulated value, wherein
   the correction means includes:
      a correction value, hold means for holding a correction value being an integral multiple of P; and
      a correction control means for allowing the adder to subtract the correction value held by the correction value hold means from the accumulated value held by the third register when the accumulated value is larger than a predetermined value.

68. The modular multiplication apparatus of claim 67, wherein
   the third register includes a sign bit,
   the correction control means allows the adder to subtract the correction value at the same time the adder adds up the partial product and the accumulated value when the accumulated valve stored in the third register is positive, and
   the correction value is an integral multiple of P and the absolute value of the correction value is equivalent to or smaller than a maximum value $(t+1)(2^s-1) P$ of the partial product.

69. The modular multiplication apparatus of claim 48, wherein
   the second calculation means Includes:
      a judgment means for judging whether all bits of the s-bit partial multiplier output from the output means are 1;
      a first generation means for generating a product of a multiplication of the intermediate value and $2^s$; and generating a negative value of the multiplicand;

a second generation means for generating a product of a multiplication of the intermediate value and a bit weight of each bit of the partial multiplier, wherein the product is equivalent to the intermediate value shifted by the number of bits corresponding to each bit weight; and a second addition means for: adding up each value generated by the first generation means when the judgment means judges that the all bits are 1; and adding up products corresponding to bits being binary value "1" in the partial multiplier out of the products generated by the second generation means when the judgment means does not judge that the all bits are 1.

70. The modular multiplication apparatus of claim 69, wherein the second generation means includes:
$i^{th}$ shift means for obtaining a shifted intermediate value by performing a shift of i bits on the intermediate value calculated by the first calculation means, wherein i represents integers in a range of 1 to (s−1), the first generation means includes:
$s^{th}$ shift mean for obtaining a shifted intermediate value by performing a shift of s bits on the intermediate value calculated by the first calculation means;
a complement generation means for generating a one's complement of the intermediate value; and
a constant output meant for outputting a constant 1, wherein the second addition means includes:
a selection means for: selecting the shifted intermediate value output from the $s^{th}$ shift means, the one's complement generated by the complement generation means, and the constant 1 when the judgment means judges that the all bits are 1; and selecting the intermediate value when a bit at a place of $2^0$ of the partial multiplier has binary value "1" when the judgment means does not judge that the all bits are 1; and selecting the shifted intermediate value output from the $1^{th}$ shift means when a bit at a place of $2^i$ of the partial multiplier has binary value "1" when the judgment means does not judge that the all bits are 1; and
an adder for calculating the partial product by adding up values selected by the selection means.

71. The modular multiplication apparatus of claim 48, wherein s=3n, the partial multiplier is divided into n 3-bit data sequences s1, . . . sn in order from lower bits, the second calculation means includes:
$j^{th}$ judgment means for judging whether the 3-bit data sequence sj is $(111)_2$, wherein j represents integers in a range of 1 to n,
$j^{th}$ special generation means for generating a product of $I*(1000)_2*2^{3(j-1)}$ (I representing the intermediate value) and generating N (N representing a negative value of $I*2^{3(j-1)}$) when the $j^{th}$ judgment means judges that the 3-bit data sequence sj is $(111)_2$, wherein $2^{3(j-1)}$ corresponds to a place of the 3-bit data sequence sj:
$j^{th}$ general generation means for generating, for each bit of the 3-bit data sequence sj, products of multiplications of a logical value of document bit, each bit weight of each bit in the s-bit partial multiplier, and the intermediate value when the $j^{th}$ judgment means does not judge that the 3-bit data sequence sj is $(111)_2$, wherein the product is equivalent to the intermediate value shifted by the number of bits corresponding to the bit weight; and a second addition means for adding up the products generated by the $j^{th}$ special generation means and the $j^{th}$ general generation means.

72. The modular multiplication apparatus of claim 71, wherein the second calculation means includes:
$i^{th}$ shift means for obtaining a shifted intermediate value by performing a shift of i bits on the intermediate value, wherein i represents integers in a range of 1 to s, wherein the $j^{th}$ general generation means when j=1 uses shifted intermediate values obtained by the $i^{th}$ shift means when i=1, 2, the $j^{th}$ general generation means when j≠1 uses shifted intermediate values obtained by the $(3j-3)^{th}$ shift means, the $(3j-2)^{th}$ shift means, and the $(3j-1)^{th}$ shift means, the $j^{th}$ special generation means uses shifted intermediate values obtained by the $3j^{th}$ shift means, and the $j^{th}$ special generation means and the (j+1) general generation means share the $3j^{th}$ shift means.

73. The modular multiplication apparatus of claim 72, wherein the $j^{th}$ special generation means includes:
a complement generation means for generating one's complement of either of the intermediate value and the shifted intermediate value obtained by the $(3j-3)^{th}$ shift means; and
a constant output means for outputting the constant 1, the second addition means includes:
a selection means for: selecting the shifted intermediate value output from the $3j^{th}$ shift means, the one's complement generated by the complement generation means of the $j^{th}$ special generation means, and the constant 1 output from the constant output means of the $j^{th}$ special generation means when the $j^{th}$ judgment means judges that the 3-bit data sequence sj is $(111)_2$; selecting the intermediate value and outputs from the $(3j-2)^{th}$ shift means and the $(3j-1)^{th}$ shift means when the $j^{th}$ judgment means does not judge that the 3-bit data sequence s1 is $(111)_2$; and selecting outputs from the $(3j-3)^{th}$ shift means, the $(3j-2)^{th}$ shift means, and the $(3j-1)^{th}$ shift means when the $j^{th}$ judgment means does not judge that the 3-bit data sequence sj except for the 3-bit date, sequence s1 is $(111)_2$; and
an adder for calculating the partial product by adding up values selected by the selection means.

74. The modular multiplication apparatus of claim 48 further comprising:

a post-processing means for using the division means, the read means, and the addition means to obtain a residue of a modulo P multiplication of a last accumulated value having been corrected by the correction means, wherein the last accumulated value is an accumulated value corrected by the correction means in correspondence to the partial multiplier output last from the output means.

75. A modular multiplication apparatus for calculating a congruent value of a modulo P multiplication of a product of a multiplicand and a multiplier, wherein P is k-bit data, the modular multiplication apparatus comprising:

an output means for outputting, in order from lower bits, partial multipliers which are s-bit parts making up the multiplier, wherein s is an integer 2 or larger;

a first calculation means for obtaining shifted multiplicands by shifting the multiplicand in accordance with a place of each partial multiplier, and, for calculating congruent values of a modulo p multiplication of respective shifted multiplicands, wherein the congruent values obtained here are referred to as intermediate values;

a second calculation Means for calculating partial products by multiplying the partial multipliers output from the output means by the corresponding intermediate values output from the first calculation means;

an accumulation means for accumulating the partial products output from the second calculation means and outputting an accumulated value;

a correction means for performing a correction so that the accumulated value does not exceed a predetermined number of bits by adding/subtracting an integral multiple of p to/from the accumulated value; and a control means for allowing the first calculation means, the second calculation means, the accumulation means, and the correction means to repeatedly perform the respective operations for each of the partial multipliers output from the output means, wherein the second calculation means includes:
  a judgment means for judging whether all bits of the s-bit partial multiplier output from the output means are 1:
  a first generation means for generating a product of the intermediate value*$2^s$; and generating a negative value of the multiplicand;
  a second generation means for generating a product of the intermediate value and a bit weight of each bit of the partial multiplier, wherein the product is equivalent to the intermediate value shifted by the number of bits corresponding to each bit weight;
  an addition means for: adding up each value generated by the first generation means when the judgment means judges that the all bits are 1; and adding up products corresponding to bits being binary value "1" in the partial multiplier out of the products generated by the second generation means when the judgment means does not judge that the all bits are 1.

76. The modular multiplication apparatus of claim 75, wherein
  the second calculation means includes:
    a judgment means for judging whether all bits of the s-bit partial multiplier output from the output means are 1;
    a first generation means for generating a product of a multiplication of the intermediate value and 2s; and generating a negative value of the multiplicand;
    a second generation means for generating a product of a multiplication of the intermediate value and a bit weight of each bit of the partial multiplier, wherein the product is equivalent to the intermediate value shifted by the number of bits corresponding to each bit weight; and
    a second addition means for; adding up each value generated by the first generation means when the judgment means judges that the all bits are 1; and adding up products corresponding to bits being binary value "1" in the partial multiplier out of the products generated by the second generation means when the judgment means does not judge that the all bits are 1.

77. A modular multiplication apparatus for calculating a congruent value of a modulo p multiplication of a product of a multiplicand and a multiplier, wherein P is k-bit data, the modular multiplication apparatus comprising:

an output means for outputting, in order from lower bits, partial multipliers which are s-bit parts making up the multiplier, wherein s is an integer 2 or larger;

a first calculation means for obtaining shifted multiplicands by shifting the multiplicand in accordance with a place of each partial multiplier, and for calculating congruent values of a modulo p multiplication of respective shifted multiplicands, wherein the congruent values obtained here are referred to as intermediate values;

a second calculation means for calculating partial products by multiplying the partial multipliers output from the output means by the corresponding intermediate values output from the first calculation means;

an accumulation means for accumulating the partial products output from the second calculation means and outputting an accumulated value;

a correction means for performing a correction so that the accumulated value does not exceed a predetermined number of bits by adding/subtracting an integral multiple of p to/from the accumulated value; and a control means for allowing the first calculation means, the second calculation means, the accumulation means, and the correction means to repeatedly perform the respective operations for each of the partial multipliers output from the output means, wherein $s=3n$, the partial multiplier is divided into n 3-bit data sequences sn, . . . s1 in order from lower bits, the second calculation means includes:
  $j^{th}$ judgment means for judging whether the 3-bit data sequence s1, is $(111)_2$, wherein j represents integers in a range of 1 to n,
  $j^{th}$ special generation means for generating a product of the intermediate value*$(1000)_2$*$2^{3(j-1)}$ and generating (a negative value of the multiplicand)*$2^{3(j-1)}$ when the $j^{th}$ judgment means judges that the 3-bit data sequence sj is $(111)_2$, wherein $2^{3(j-1)}$ corresponds to a place of the 3-bit data sequence sj;
  $j^{th}$ general generation means for generating, for each bit of the 3-bit data sequence sj, a product of (a logical value of a current bit)*(a bit weight of the current bit in the s-bit partial multiplier)*the intermediate value when the $j^{th}$ judgment means does not judge that the 3-bit data sequence sj is $(111)_2$, wherein the product is equivalent to the intermediate value shifted by the number of bits corresponding to each bit weight; and
  an addition means for adding up the products generated by the $j^{th}$ special generation means and the $j^{th}$ general generation means.

78. The modular multiplication apparatus of claim 77, wherein
  the second calculation means includes:
    $i^{th}$ shift means for obtaining a shifted intermediate value by performing a shift of i bits on the intermediate value, wherein i represents integers in a range of 1 to s, wherein
  the $j^{th}$ general generation means when $j=1$ uses shifted intermediate values obtained by the $j^{th}$ shift means when $i=1, 2$,
  the $j^{th}$ general generation means when $j \neq 1$ uses shifted intermediate values obtained by the $(3j-3)^{th}$ shift means, the $(3j-2)^{th}$ shift means, and the $(3j-1)$ shift means, the $j^{th}$ special generation means uses shifted intermediate values obtained by the $3j^{th}$ shift means, and the $j^{th}$ special generation means and the (j+1) general generation means share the $3j^{th}$ shift means.

79. The modular multiplication apparatus of claim 78, wherein the $j^{th}$ special generation means includes:

a complement generation means for generating one's complement of either of the intermediate value and the shifted intermediate value obtained by the $(3j-3)^{th}$ shift means; and a constant output means for outputting the constant 1, the second addition means includes:

a selection means for: selecting the shifted intermediate value output from the $3j^{th}$ shift means, the one's complement generated by the complement generation means of the $j^{th}$ special generation means, and the constant 1 output from the constant output means of the $j^{th}$ special generation means when the $j^{th}$ judgment means judges that the 3-bit data sequence sj is $(111)_2$; selecting the intermediate value and outputs from the $(3j-2)^{th}$ shift means and the $(3j-1)^{th}$ shift means when the $j^{th}$ judgment means does not judge that the 3-bit data sequence s1 is $(111)_2$; and selecting outputs from the $(3j-3)^{th}$ shift means, the $(3j-2)$ shift means, and the $(3j-1)^{th}$ shift means when the $j^{th}$ judgment means does not judge that the 3-bit data sequence sj except for the 3-bit data sequence s1 is $(111)_2$; and an adder for calculating the partial product by adding up values selected by the selection means.

* * * * *

UNITED STATES PATENT AND TRADEMARK OFFICE
CERTIFICATE OF CORRECTION

PATENT NO. : 6,366,940 B1
DATED : April 2, 2002
INVENTOR(S) : Takatoshi Ono, Natsume Matsuzaki and Hiroshi Kashiwa It is certified that error appears in the above-identified patent and that said Letters Patent is hereby corrected as shown below:

Column 10,
Line 6, delete "(j+1)" and insert -- $(j+1)^{th}$ --.
Line 20, delete "(3j-1)" and insert -- $(3j-1)^{th}$ --.

Column 29,
Line 61, after "(i=0)" insert -- , --.
Line 64, delete "in" and insert -- m --.

Column 30,
Line 21, delete "-for" and insert -- for --.
Line 40, delete "Value" and insert -- value --.
Line 58, delete "Part" and insert -- part --.
Line 64, delete ",".

Column 31,
Line 20, delete the third occurrence of ",".
Line 66, delete "1", and insert -- P --.

Column 32,
Line 17, delete "Multiplication" and insert -- multiplication --.

Column 33,
Line 5, delete "$^{+m1}$".

Column 34,
Lines 14 and 59, delete "$(2^{s-1})$" and insert -- $(2^s-1)$ --.
Line 62, delete "p" and insert -- P --.

Column 35,
Line 20, after "means" insert -- , --.

Column 36,
Line 39, delete "mean" and insert -- means --.
Line 53, delete "on".

UNITED STATES PATENT AND TRADEMARK OFFICE
CERTIFICATE OF CORRECTION

PATENT NO. : 6,366,940 B1
DATED : April 2, 2002
INVENTOR(S) : Takatoshi Ono, Natsume Matsuzaki and Hiroshi Kashiwa It is certified that error appears in the above-identified patent and that said Letters Patent is hereby corrected as shown below:

<u>Column 37,</u>
Line 24, after "for" insert -- , --.

<u>Column 38,</u>
Lines 24, 30 and 42, delete ",".
Line 59, delete "means'" and insert -- means --.

<u>Column 39,</u>
Line 15, after "I*$2^{3(j-1)}$" insert -- ) --.
Line 44, delete "(3j-1)" and insert -- $(3j-1)^{th}$ --.
Line 49, delete "(j+1)" and insert -- $(j+1)^{th}$ --.

<u>Column 40,</u>
Lines 15 and 22, delete "p" and insert -- P --.
Line 24, delete "k1≤k" and insert -- k1≥k --.
Line 54, delete "calculator" and insert -- calculation --.

<u>Column 41,</u>
Line 49, delete the first occurrence of ",".
Line 54, delete "stared" and insert -- stored --.

<u>Column 42,</u>
Line 20, after "the" insert -- t --.
Line 34, delete "-".
Line 44, delete "sigh" and insert -- sign --.
Line 45, delete ",".
Line 52, delete "(t+1)($2^G$-1)P" and insert -- (t+1)($2^S$-1)P --.
Line 54, delete the first occurrence of ",".

<u>Column 43,</u>
Line 60, delete ",".

<u>Column 44,</u>
Line 40, delete ",".
Line 53, delete "valve" and insert -- value --.
Line 61, delete "Includes" and insert -- includes --.

UNITED STATES PATENT AND TRADEMARK OFFICE
CERTIFICATE OF CORRECTION

PATENT NO. : 6,366,940 B1
DATED : April 2, 2002
INVENTOR(S) : Takatoshi Ono, Natsume Matsuzaki and Hiroshi Kashiwa It is certified that error appears in the above-identified patent and that said Letters Patent is hereby corrected as shown below:

<u>Column 45,</u>
Line 39, delete "$1^{th}$" and insert -- $i^{th}$ --.
Line 64, delete "document" and insert -- a current --.

<u>Column 46,</u>
Line 22, delete "(j+1)" and insert -- $(j+1)^{th}$ --.
Line 47, delete "date" and insert -- data --.

<u>Column 47,</u>
Line 3, after "and" delete ",".
Line 8, delete "Means" and insert -- means --.
Line 60, delete ";" and insert -- : --.

<u>Column 48,</u>
Line 2, delete "p" and insert -- P --.
Line 35, delete "sl" and insert -- sj --.
Line 66, delete "(3j-1)" and insert -- $(3j-1)^{th}$ --.

<u>Column 49,</u>
Line 3, delete "(j+1)" and insert -- $(j+1)^{th}$ --.

<u>Column 50,</u>
Line 10, delete "(3j-2)" and insert -- $(3j-2)^{th}$ --.

Signed and Sealed this

Fifteenth Day of April, 2003

JAMES E. ROGAN
*Director of the United States Patent and Trademark Office*